(12) United States Patent
Braedt

(10) Patent No.: US 12,037,080 B2
(45) Date of Patent: Jul. 16, 2024

(54) BICYCLE BRACKET ELEMENT

(71) Applicant: SRAM DEUTSCHLAND GmbH, Schweinfurt (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 622 days.

(21) Appl. No.: 16/718,494

(22) Filed: Dec. 18, 2019

(65) Prior Publication Data

US 2020/0198728 A1 Jun. 25, 2020

(30) Foreign Application Priority Data

Dec. 21, 2018 (DE) ...................... 10 2018 222 834.5

(51) Int. Cl.
| | | |
|---|---|---|
| *B62M 9/125* | (2010.01) | |
| *B62K 19/30* | (2006.01) | |
| *B62M 9/121* | (2010.01) | |
| *B62M 9/135* | (2010.01) | |
| *B62K 19/34* | (2006.01) | |

(52) U.S. Cl.
CPC ............ *B62M 9/125* (2013.01); *B62K 19/30* (2013.01); *B62K 19/34* (2013.01); *B62M 9/121* (2013.01); *B62M 9/135* (2013.01)

(58) Field of Classification Search
CPC ........ B62K 19/30; B62K 19/44; B62K 19/16; B62K 25/02; B62M 9/121; B62M 9/125; B62M 9/135; B62M 9/126; B62M 9/136
See application file for complete search history.

(56) References Cited

U.S. PATENT DOCUMENTS

| | | | | |
|---|---|---|---|---|
| 3,960,025 | A * | 6/1976 | Hippolyte Juy | ....... B62M 9/126 474/82 |
| 4,540,193 | A * | 9/1985 | Noda | ..................... B62K 19/16 180/219 |
| 4,565,383 | A | 1/1986 | Isaac | |
| 5,002,520 | A | 3/1991 | Greenlaw | |
| 5,082,303 | A * | 1/1992 | Duehring | ............... B62K 25/02 280/288 |
| 5,096,215 | A * | 3/1992 | Chonan | .................. B62K 25/02 280/281.1 |

(Continued)

FOREIGN PATENT DOCUMENTS

| | | |
|---|---|---|
| DE | 2260252 | 6/1973 |
| DE | 202006003055 | 9/2006 |

(Continued)

OTHER PUBLICATIONS

EP3556647 to Wecker, English translation (Year: 2019).*

(Continued)

*Primary Examiner* — Anne Marie M Boehler

(57) ABSTRACT

A bicycle bracket element connects a bicycle frame to a rear gearshift mechanism of a derailleur system. The bracket element includes a first portion which has a cutout for receiving a portion of a bicycle rear wheel axle and a second portion which has a mounting opening to which the rear gearshift mechanism can be secured. The bracket element is formed with a region made from plastic and a region made from metal. The region made from plastic is fixedly connected to the region made from metal.

9 Claims, 11 Drawing Sheets

(56) References Cited

U.S. PATENT DOCUMENTS

| | | | |
|---|---|---|---|
| 7,189,172 B2 | 3/2007 | Shahana et al. | |
| 8,491,427 B2* | 7/2013 | Gratz | B60B 5/02 |
| | | | 280/288.4 |
| 9,545,971 B2* | 1/2017 | Beutner | B62K 19/16 |
| 10,472,019 B2* | 11/2019 | Pfeiffer | B62K 25/02 |
| 11,230,350 B2 | 1/2022 | Braedt | |
| 2005/0250608 A1* | 11/2005 | Dal Pra' | B62M 9/126 |
| | | | 474/80 |
| 2006/0105869 A1* | 5/2006 | Fukuda | B62M 9/125 |
| | | | 474/82 |
| 2008/0153641 A1* | 6/2008 | Chen | B62M 9/126 |
| | | | 474/82 |
| 2009/0152042 A1* | 6/2009 | Pierick | B62K 19/16 |
| | | | 180/311 |
| 2013/0241175 A1 | 9/2013 | Talavasek et al. | |
| 2014/0054873 A1 | 2/2014 | Cocalis | |
| 2014/0306512 A1* | 10/2014 | Nakajima | B60B 35/004 |
| | | | 301/132 |
| 2018/0265169 A1* | 9/2018 | Braedt | B62M 9/125 |
| 2022/0144381 A1* | 5/2022 | Rodriguez | B62M 11/04 |

FOREIGN PATENT DOCUMENTS

| | | | | |
|---|---|---|---|---|
| DE | 60309274 T2 | 8/2007 | | |
| DE | 10 2018 206 104 A1 | 10/2019 | | |
| DE | 10 2018 206 134 A1 | 10/2019 | | |
| EP | 2527239 | 11/2012 | | |
| EP | 3095684 | 11/2016 | | |
| EP | 3187402 | 7/2017 | | |
| EP | 3556647 A1 * | 10/2019 | | B62J 13/00 |

OTHER PUBLICATIONS

Rex Plastics, "A Rookie's Guide to Plastic Injection molding" at https://rexplastics.com/plastic-injection-molding/plastic-injection-molding-guide), p. 3, May 2019 (Year: 2019).*

* cited by examiner

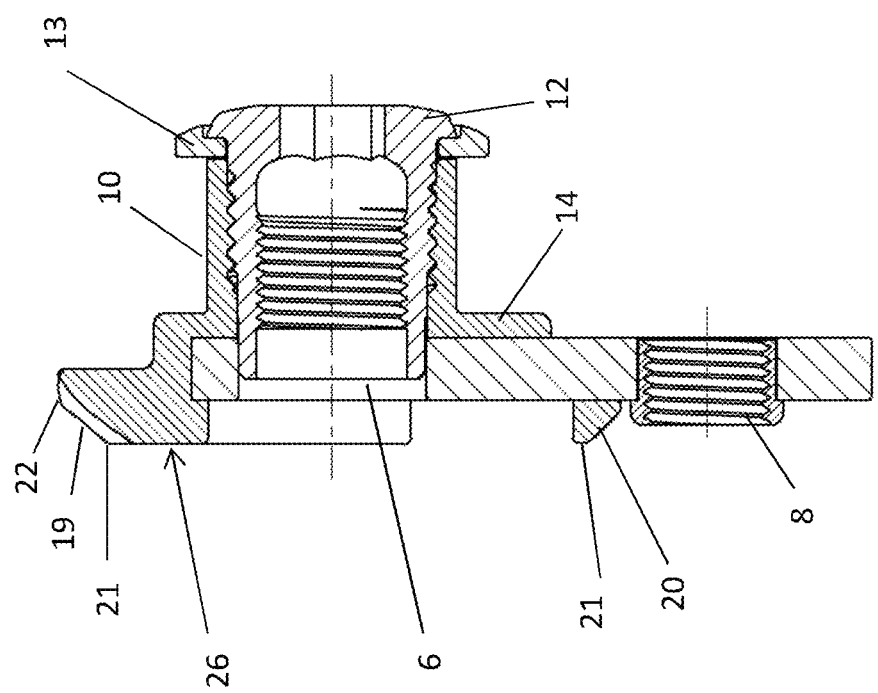
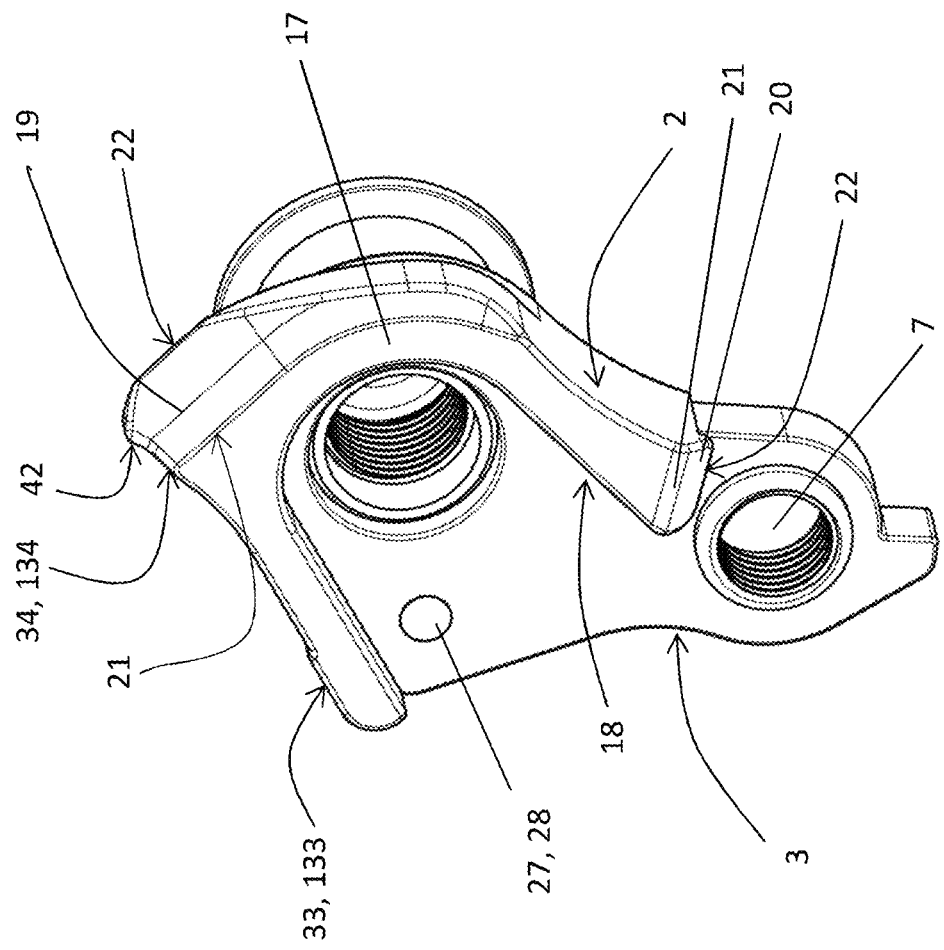
Fig. 2a
Fig. 2b

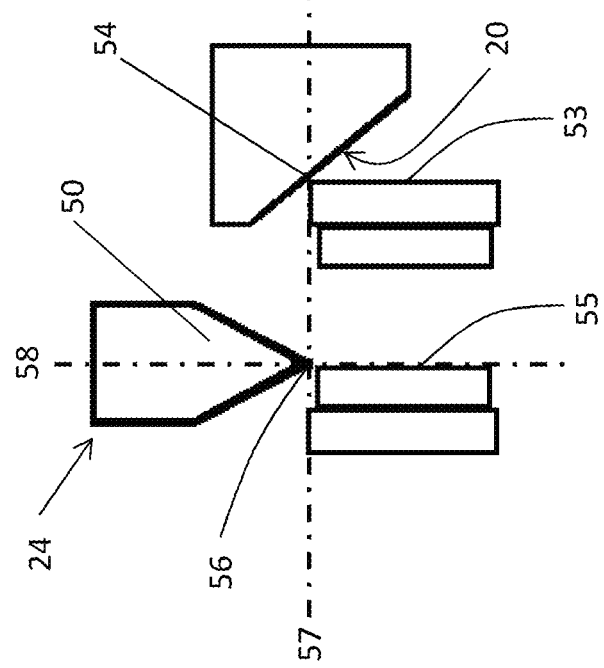
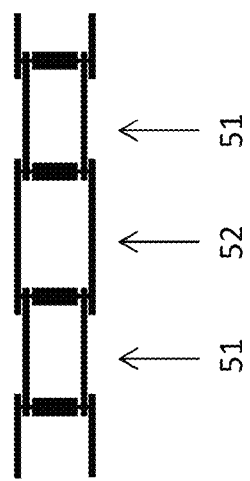

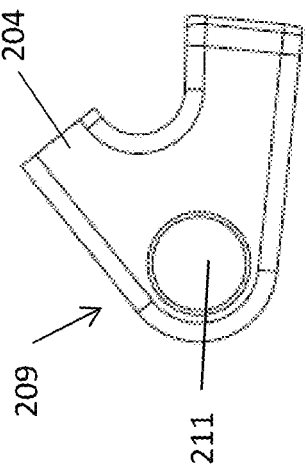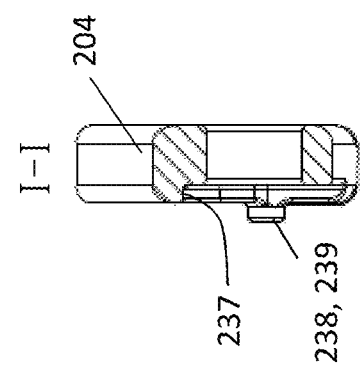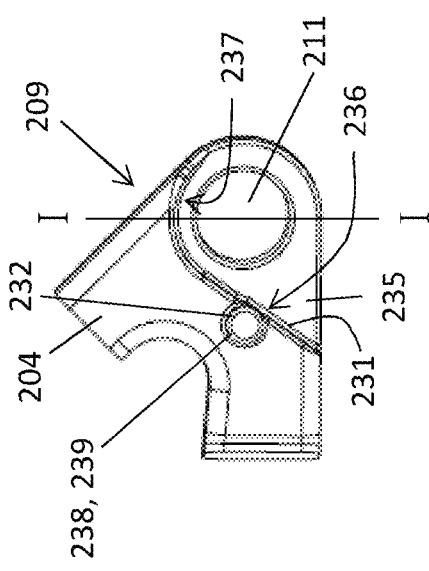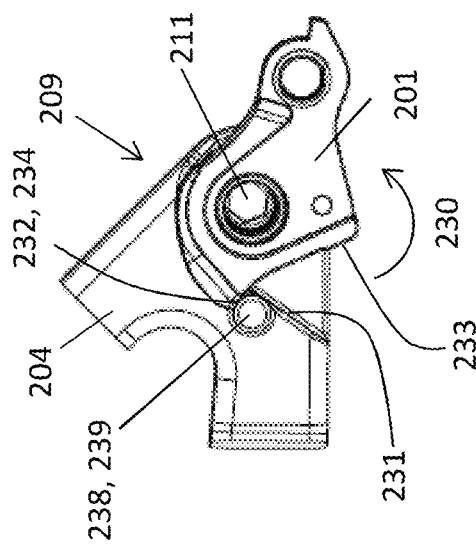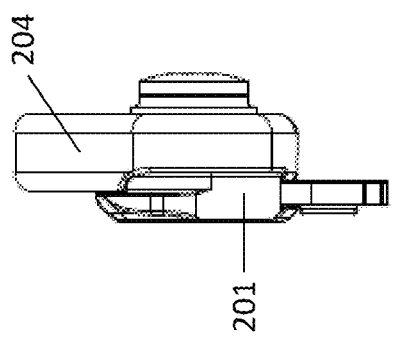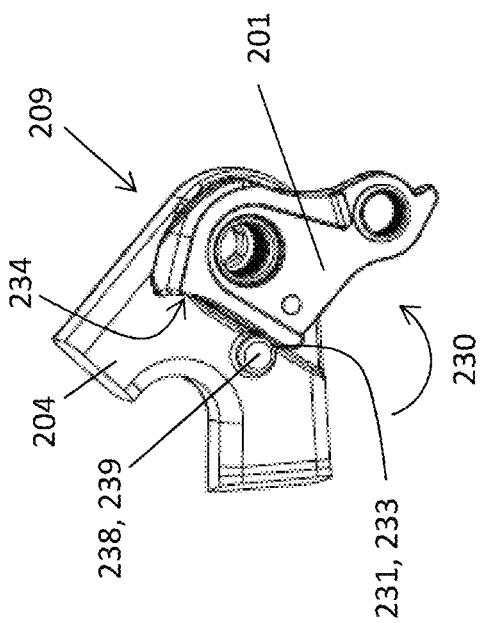

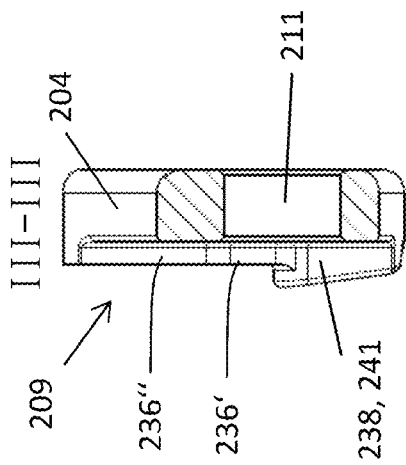
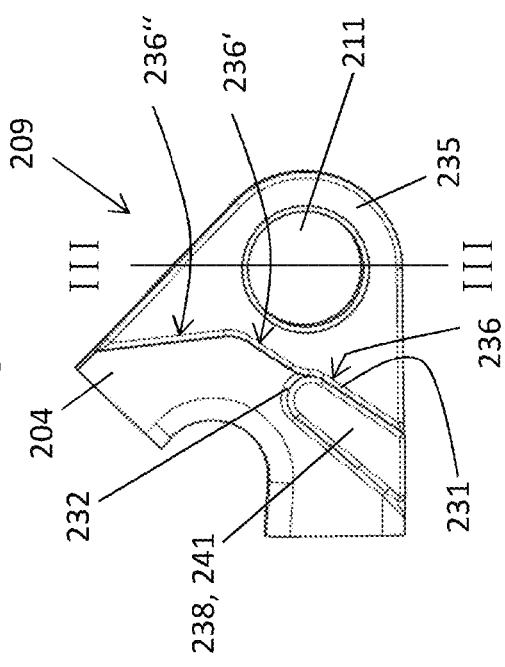
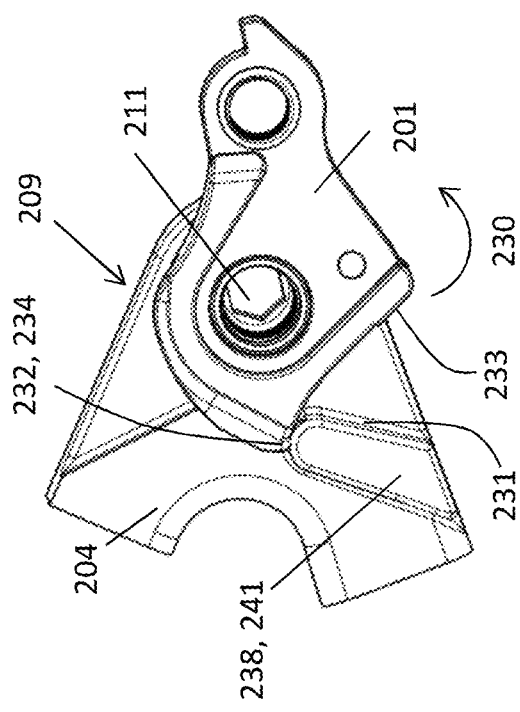
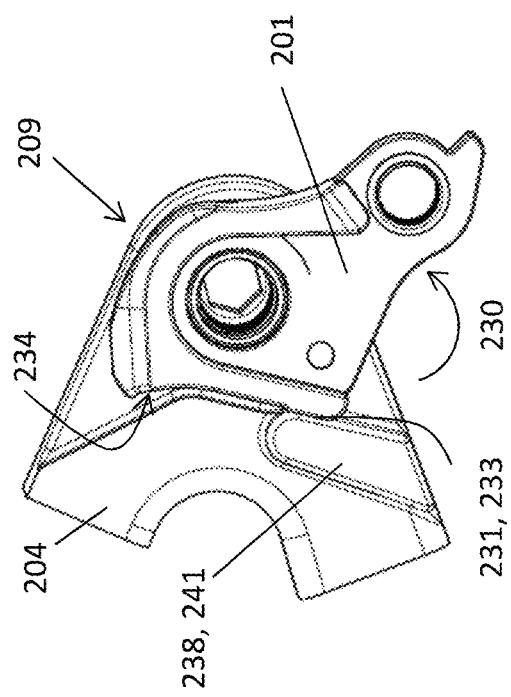

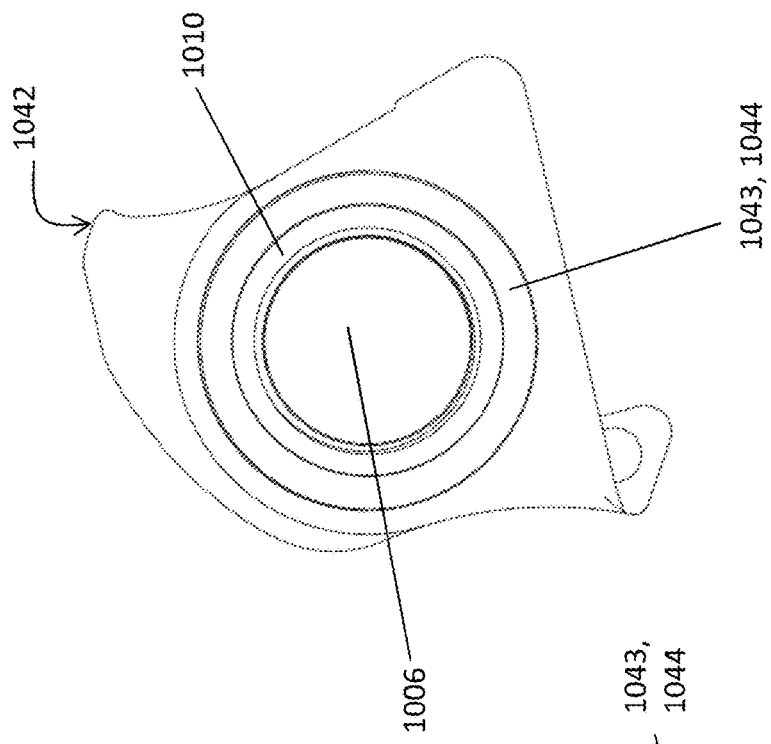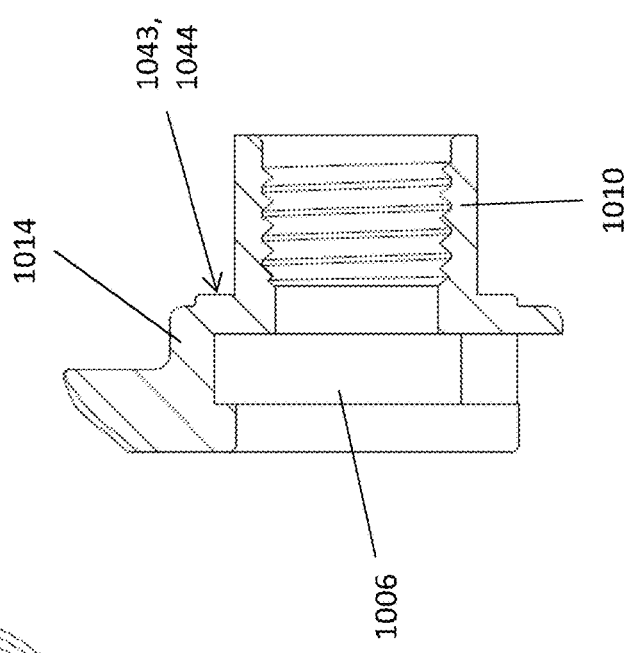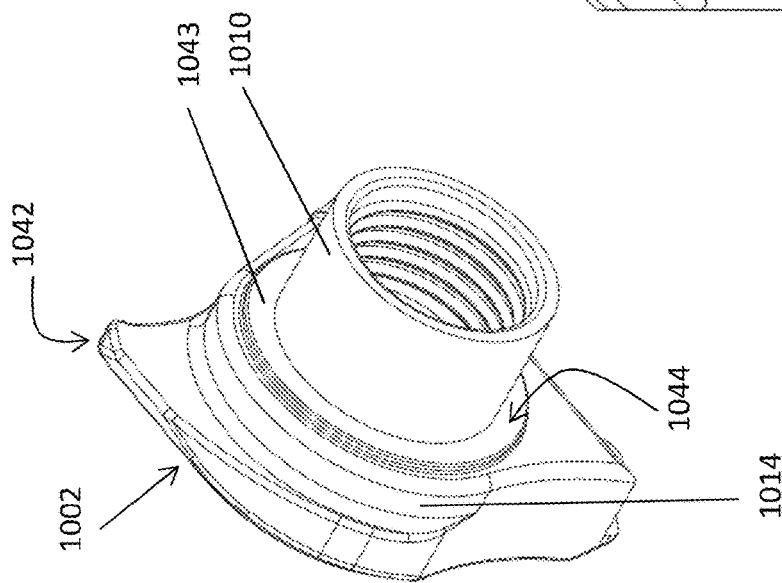

BICYCLE BRACKET ELEMENT

PRIORITY

This application claims priority to, and/or the benefit of, German patent application DE 10 2018 222 834.5, filed on Dec. 21, 2018, the contents of which are included by reference herein in their entirety.

FIELD OF INVENTION

The present disclosure relates to a bracket element for a bicycle, which is configured to connect a bicycle frame to a rear gearshift mechanism of a derailleur system to a bicycle with a bracket element.

BACKGROUND

Rear gearshift mechanisms are commonly fastened to the right-hand dropout of a bicycle frame with a derailleur hanger. The derailleur hanger is generally a bracket element which is separate from the bicycle frame (cf. for example, DE 20 2019 000 904 U1, EP 3 095 684 B1, EP 3 187 402 B1 and US 2013/0241175 A1) and which is mounted on the right-hand dropout and has a mounting opening, offset radially in relation to the rear wheel axle, for the attachment of the basic element of the gearshift mechanism. Although the term "derailleur hanger" may have originally related to the mounting opening itself, in technical terminology the bracket element having the mounting opening is referred to as a "derailleur hanger". In English technical terminology, the term "hanger" is common for the bracket element. Also known are bicycle frames with a derailleur hanger which is integrated, in particular integrally formed, in the right-hand dropout (cf., for example, U.S. Pat. No. 4,565,383 and DE-A 2 260 252), but which are of lesser interest within the context of the present disclosure.

For the mounting of the rear gearshift mechanism, the derailleur hanger, which is separate from the bicycle frame, is generally fixed at one end to the frame coaxially with respect to the rear wheel axle and is connected at the other end to the basic element (also known as the "B knuckle") of the rear gearshift mechanism. The basic element is rotatable relative to the derailleur hanger about an axis of rotation (B axis) in order to be able to rotationally set the gearshift mechanism, and thus a sprocket set of a rear wheel, into a relative desired position with respect to the rear axle. It is thus possible for a chain guide arrangement which is mounted on a movable element (also known as the "P knuckle") so as to be rotatable about an axis of rotation (P axis) to be brought into the correct initial position. The movable element is connected to the basic element with a motion mechanism, in particular pivot mechanism.

Derailleur hangers differ greatly from one another depending on manufacturer and type of attachment. They may, as already mentioned, be formed integrally with the frame or, as is of particular interest here, be provided as a separate component. Separate derailleur hangers are generally clamped to the frame either by quick-release axles or by plug-in axles. Clamping is possible both on the frame outer side and on the frame inner side. This has the result that, depending on the derailleur hanger used, the gearshift mechanism assumes a different position relative to the rear wheel axle and also relative to the sprocket set. These differences in position in an axial and in a radial direction complicate the design of the gearshift mechanism and the mounting thereof. The gearshift mechanism has to be duly set depending on the derailleur hanger.

Possible adaptations of a bracket element to a bracket portion of a bicycle frame by a plurality of functional components which, for example, can compensate for protruding differences in positioning, but can also make mounting of the rear wheel easier, are known from patent application DE 10 2018 206 104 belonging to the same applicant.

SUMMARY

According to one aspect, a bicycle bracket element for connecting a bicycle frame to a rear gearshift mechanism of a derailleur system includes a first portion having a cutout for receiving a bicycle rear wheel axle, and a second portion having a mounting opening to which the rear gearshift mechanism is secured. The bracket element is formed with a plastic region and a metal region, the plastic region is fixedly connected to the metal region.

BRIEF DESCRIPTION OF DRAWINGS

FIG. 2a shows a sectional view of the bracket element of FIG. 1;

FIG. 2b shows a perspective view of the bracket element of FIG. 1;

FIG. 3b is an enlarged view of a portion of the assembly in FIG. 3a;

FIG. 4a is a top view of a schematically illustrated chain;

FIG. 4b is a schematic illustration of a diverting surface region of a bracket element, a chain and a tooth tip of a sprocket tooth according to an exemplary embodiment;

FIG. 6a shows a rear end of a frame with a bracket portion designed according to a first exemplary embodiment with a depression designed according to a first alternative and a projection designed according to a first alternative, as viewed from the inner side of the bracket portion;

FIG. 6b shows a sectional view of the rear end of a frame with a bracket portion designed according to a first exemplary embodiment with a depression designed according to a first alternative and a projection designed according to the first alternative, formed along line I-I;

FIG. 6c shows a rear end of a frame with a bracket portion designed according to a first exemplary embodiment with a depression designed according to the first alternative and a projection designed according to a first alternative, as viewed from the outer side; of the bracket portion FIG. 7a shows the bracket portion illustrated in FIG. 6 with a bracket element mounted thereon, where the bracket element is illustrated in a first stop position with the bracket portion as viewed from an inner side of the bracket portion;

FIG. 7b shows the bracket portion illustrated in FIG. 6 with a bracket element mounted thereon, where the bracket element is illustrated in a first stop position with the bracket portion as viewed from a rear side of the bracket portion;

FIG. 7c shows the bracket portion illustrated in FIG. 6 with a bracket element mounted thereon, where the bracket element is illustrated in a second stop position with the bracket portion as viewed from an inner side of the bracket portion;

FIG. 10a shows a rear end of a frame with a bracket portion designed according to a first exemplary embodiment with a depression designed according to a third alternative and a projection designed according to a third alternative, as viewed from an inner side of the bracket portion;

FIG. 10b shows a sectional view formed along line in FIG. 10a of the rear end of the frame;

FIG. 11a shows the bracket portion illustrated in FIG. 10a with a bracket element mounted thereon, where the bracket element is illustrated in a first stop position with the bracket portion, as viewed from the inner side of the bracket portion;

FIG. 11b shows the bracket portion illustrated in FIG. 10a with a bracket element mounted thereon, where the bracket element is illustrated in a second stop position with the bracket portion, as viewed from the inner side of the bracket portion;

FIG. 16a shows a perspective view of a further exemplary embodiment of the bracket element;

FIG. 16b shows a sectional view of the embodiment in FIG. 16a; and

FIG. 16c shows a rear view of the embodiment in FIG. 16a.

Other aspects and advantages of the embodiments disclosed herein will become apparent upon consideration of the following detailed description, wherein similar or identical structures have similar reference numerals.

DETAILED DESCRIPTION

Figure 1:
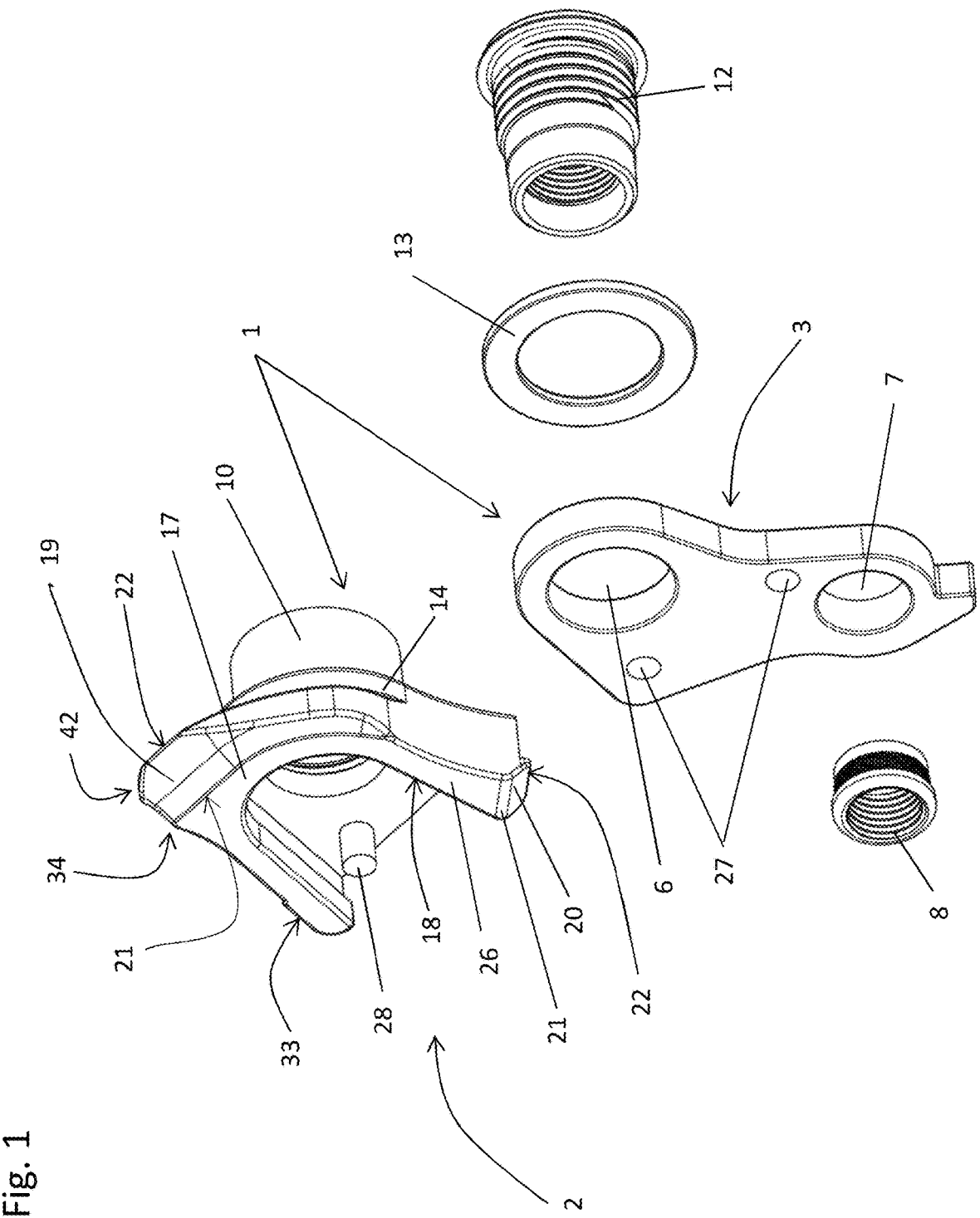
FIG. 1 shows an exploded illustration of a bracket element according to an exemplary embodiment.

The present disclosure considers a bracket element by which a rear gearshift mechanism of a derailleur system can be mounted on a rear bracket portion of a bicycle frame, specifically non-coaxially with respect to the rear wheel axle. The provision of a bicycle equipped with a derailleur system having such a conventional rear gearshift mechanism can expediently take place (as is known per se) on the basis of the following and further conventional components: a rear wheel with a stator arrangement, which comprises a rear wheel axle arrangement, and with a rotor arrangement, which is mounted or can be mounted so as to be rotatable relative to the stator arrangement and which comprises a wheel hub which bears a sprocket set of the derailleur system; a bicycle frame which has a left-hand rear bracket portion and a right-hand rear bracket portion for an inner axle of the rear-wheel axle arrangement of the rear wheel, which bracket portions have a predetermined defined axial spacing along a geometrical axis of the inner axle mounted on the frame by the bracket portions, and which bracket portions form in each case one counterbearing for a component group which is arranged on the inner axle and which in the mounted state is clamped between the bracket portions and which comprises an assembly of the stator arrangement; and the rear gearshift mechanism for non-coaxial mounting with respect to the geometrical axis, having: a basic element, a motion mechanism designed as a pivot mechanism, a movable element, and a chain guide arrangement.

The motion mechanism connects the basic element to the movable element, and the chain guide arrangement is connected to the movable element so as to be rotatable about an axis of rotation. The basic element comprises a first attachment end for mounting on the bicycle frame or a bracket element (derailleur hanger) in a manner offset radially in relation to the geometrical axis and a second attachment end for coupling to the motion mechanism. The bracket element serves for mounting the rear gearshift mechanism on the bicycle frame, where consideration is given in particular to a bracket element which is positionable or positioned on an axial inner side of an associated one of the rear bracket portions. When the rear gearshift mechanism is mounted on the bicycle frame, such a bracket element (derailleur hanger) belongs to the component group which, in the mounted state, is clamped between the bracket portions. A mounting opening of the bracket element, by which mounting opening the first attachment end of the basic element can be secured to the bracket element, is then offset radially in relation to the geometrical axis.

The frame manufacturer generally provides such a bracket element, which is required for the mounting, together and coordinated with one another. An exact fit is thereby obtained between frame and bracket element, but this does not take into consideration the use of further bicycle components, such as, for example, the gearshift mechanism and the rear wheel hub. Tolerances which are dependent on the choice of the bracket element can thereby arise, the tolerances making it difficult for the rear gearshift mechanism for changing the chain between various chain sprockets during a gear change to be set exactly and may thus result in a fault state in which the gear change takes place with a delay or the chain even becomes disengaged from the chain sprocket.

Furthermore, in the event of an unintentional force acting on one of the components mentioned, for example in the event of a bicycle fall, the derailleur hanger as a separate component which is connected releasably to the bracket portion and the gearshift mechanism serves for protecting the expensive or often irreparable bicycle components, i.e. the bicycle frame and the rear gearshift mechanism, by the derailleur hanger providing a type of "predetermined breaking point". Using the example of a case from practical experience, this means that, after a bicycle fall in which the bracket element has been damaged, the latter can be exchanged in situ comparatively cost-effectively and with little use of material. The cyclist can carry along the replacement parts and tools required for this during each cycle tour. Although this is a practical solution, a certain time for removing the damage and knowledge in the art are required in order to exchange the bracket element.

It is therefore an object of the present disclosure to provide a bracket element and a bicycle, which bracket element and bicycle contribute to avoiding damage to a bicycle frame or/and to a derailleur system or/and to a bracket element, or/and which permit a reduction in or avoidance of disruptions during which force transmission by a bicycle chain is disrupted.

In a first aspect, the present disclosure relates to a bracket element which connects a bicycle frame to a rear gearshift mechanism of a derailleur system, and which comprises a first portion which has an opening or cutout for receiving a portion of a bicycle rear wheel axle, and a second portion which has a mounting opening to which a basic element of the rear gearshift mechanism can be secured.

According to the first aspect of the disclosure, an object is achieved in that the bracket element is formed with at least one region made from plastic and a region made from metal, and the region made from plastic is fixedly connected to the region made from metal.

In this connection, the term "fixedly connected" can be understood as meaning that the two regions, i.e. the region made from plastic and the region made from metal, cannot be released from each other without being destroyed. For example, the region made from plastic can be cast with or adhesively bonded to the region made from metal. Alternatively, a fixed connection can also be produced by a screw connection which permits destruction-free separation of the regions with a corresponding tool; nevertheless, the regions are "fixedly connected" within the meaning of the disclosure.

Plastics components can be produced in many different dimensions, shapes and formations and in large piece numbers by injection moulding processes. With regard to the region made from plastic, a possibility is therefore provided of the region being adapted to predetermined geometries of the bicycle frame or/and of the rear gearshift mechanism of the derailleur system that is to be mounted on the bracket element. Such an adaptation makes it possible, for example, to compensate for manufacturing tolerances of the bicycle frame that otherwise have an effect on the positioning accuracy and adjustability of the rear gearshift mechanism. The bracket element therefore contributes to increasing the reliability of the shifting operations, which shift a chain of the derailleur system between various sprockets of a rear sprocket set, by use of the rear gearshift mechanism and avoiding fault states.

An adaptation of the bracket element to the predetermined geometries of the bicycle frame or/and of the rear gearshift mechanism can take place in the first portion of the bracket element, which portion has the opening or cutout for receiving the bracket portion of the bicycle rear axle. The region made from plastic is therefore predominantly arranged in the first portion of the bracket element.

The region made from plastic can be a plastic which is reinforced with fibres, in particular a plastic reinforced with glass fibres or a plastic reinforced with carbon fibres.

In an exemplary embodiment, the region made from metal is lug-shaped and extends into the first and the second portion or at least partially forms the portions and at least partially forms the opening or cutout and at least partially forms the mounting opening.

The region made from metal makes it possible to obtain a stable configuration of the bracket element. The bracket element can therefore provide sufficient strength in relation to the forces acting thereon during normal use.

Furthermore, the opening or cutout or/and the mounting opening can be located exclusively within the region made from metal. The bracket element can thereby be even more stable and therefore more durable.

The fixed connection between the region made from plastic and the region made from metal can be obtained, for example, by the region made from plastic being injection moulded around the region made from metal.

Such a connection is highly reliable and contributes to a long service life of the bracket element even if the latter is exposed to high stresses in the mounted state.

A configuration of the bracket element provides that the region made from metal is realized with at least one through hole or at least one recess, which through hole or which recess is or are filled with plastic which belongs to the region made from plastic.

The filling of the at least one through hole or the at least one recess with the plastic which belongs to the region made from plastic constitutes a possibility of realizing the fixed connection between the region made from metal and the region made from plastic in a particularly stable manner. The bracket element can thereby be even more stable and therefore more durable.

The at least one through hole filled with plastic or the at least one recess filled with plastic is formed in the second portion adjacent to the mounting opening and adjacent to an edge region of the region made from plastic. In an example, the at least one through hole or of the at least one recess is close to the edge region of the region made from metal. However rmay be preferred over an arrangement in the central region.

It is proposed in general that the bracket element, for example the region made from plastic, has at least one stop formation which is suitable for lying or stopping against at least one mating stop formation of the bicycle frame.

The stop formation can be a stop surface which at the same time can be an outer lateral edge surface of the bracket element. The bracket element can have a plurality of stop formations. For example, the region made from plastic can have a protrusion having a stop formation.

In a case in which the bracket element can be mounted on an inner side of an associated rear bracket portion of the bicycle frame, the bracket element, in particular in its region made from plastic, can have an axially protruding collar pointing away from the bracket portion. A guide opening or guide recess formed by the axially protruding collar may have a U-shaped or J-shaped form in a top view of the axially protruding collar.

If the bracket element is mounted on the associated rear bracket portion of the bicycle frame, the guide opening or guide recess formed by the axially protruding collar can be used for guiding and positioning an axle guide of a rear wheel of the bicycle during the mounting of the rear wheel on the bracket portion of the bicycle frame. For example, a sleeve of the axle guide of the rear wheel is guided here along the guide opening or positioning cutout and, at a stop against the latter, is held in position in alignment with the opening or cutout of the bracket element while the hub axle, in particular plug-in axle, is guided through the axle guide, in particular plug-in-axle guide, of the rear wheel and further through the opening or cutout in the bracket element. An exact positioning of the components with respect to one another is thereby made possible and the time for installation of the rear wheel shortened.

In an exemplary embodiment, the bracket element, for example the region made from plastic, can form a diverting surface region on which a bicycle chain can slip transversely with respect to its longitudinal direction.

The diverting surface region may be formed on an axially protruding collar. The diverting surface region is designed in such a manner that, in a fault state, i.e. if a chain is not in engagement with a sprocket of a sprocket set of the rear gearshift mechanism, but rather rests on the diverting surface region, the chain can slip in the direction of the sprocket set and can enter again into engagement with a sprocket (e.g., the smallest sprocket). The discussed fault state is thereby promptly removed without a cyclist riding the bicycle having to interrupt his/her journey. Furthermore, the diverting surface region can be configured to prevent jamming of the bicycle chain on the bicycle frame, for example between the smallest sprocket of the sprocket set of the rear gearshift mechanism and the bracket element, if the bicycle chain of the derailleur system is in the discussed fault state. Damage to the bicycle frame by the chain can thereby be prevented. In order to achieve the last-mentioned effect, the diverting surface region should be designed in such a manner that, in the mounted state, a distance between the diverting surface region and the smallest sprocket of the sprocket set is smaller than the width of bicycle chain links of the bicycle chain.

The diverting surface region may have an oblique diverting surface. In this connection, the term "obliquely" means that an angle between a flat surface of the bracket element and the oblique diverting surface is not equal to 90°. The angle between the flat surface and the oblique diverting surface can be between 70° and 10°. In an alternate example, the angle between the flat surface and the oblique diverting surface can be between 60° and 20°. In a further example, the angle between the flat surface and the oblique diverting surface can be between 30° and 50°.

The diverting surface region can also have a diverting surface, the form of which differs from a flat design. For example, the diverting surface can be bounded on its longitudinal sides by a first and a second edge. The surface between the first and the second edge can be curved substantially concavely or curved substantially convexly or can be a combination of a concave and/or convex and/or flat design.

A maximum distance of the first and the second edge, as measured in top view, can be approximately between 2 mm and 10 mm. In an alternate example, the maximum distance of the first and the second edge can be between 4 mm and 8 mm. In a further alternate example, the maximum distance of the first and the second edge can be between 5 mm and 6 mm.

Furthermore, the bracket element may have more than one diverting surface region, for example the bracket element can have two diverting surface regions, where all of the diverting surface regions can be designed in accordance with one of the above embodiments, but may differ from one another. One diverting surface region can be arranged in the mounted state adjacent to a load side of the chain while another can be arranged adjacent to a return side of the chain. The two diverting surface regions can have a different distance from the centre point of the opening or cutout.

The bracket element can be mountable on an inner side of an associated rear bracket portion of the bicycle frame and can rest on the bracket portion by the region made from plastic and/or can be brought into form-fitting connection with a bracket opening in the bracket portion.

It goes without saying that the region made from plastic can be specially adapted to the respective shape of the bracket portion, and therefore precisely fitting positioning of the bracket element is possible.

The bracket element can be mounted on the inner side of the associated rear bracket portion of the bicycle frame by a receptacle, which is formed in the region made from plastic, for a fastening screw and by a plug-in axle, wherein the receptacle can be brought into form-fitting connection with the bracket opening in the bracket portion.

The receptacle for the fastening screw can at least partially engage in the bracket opening. Furthermore, the receptacle for the fastening screw can have the form of a hollow cylinder. Therefore, the bracket element when mounted on the bracket portion can be exactly positioned and can subsequently be fixedly connected very rapidly to the bracket portion with a fastening screw.

In general, in the mounted state, the bracket element can be connected with the aid of the fastening screw to the associated rear bracket portion of the bicycle frame in such a manner that the opening or cutout of the bracket element adjoins a bracket opening in the associated rear bracket portion of the bicycle frame and the two form a common through opening for a hub axle. Consequently, in the mounted state, a hub axle can pass through the opening or cutout, the fastening screw and also through the bracket opening in the associated rear bracket portion.

The receptacle can compensate for manufacturing tolerances of the bracket portion and/or of the bracket opening thereof. This is firstly possible because of the elastic property of the plastic. Secondly, the receptacle can have a contact region and/or a compensating region, for example, a slightly conically tapering outer circumference. In general, the receptacle can improve the positioning of the bracket element in relation to the bracket portion, which in turn is significant for correct positioning of the rear gearshift mechanism and the reliability thereof during operation.

The receptacle for the fastening screw has an inner thread which can be brought into engagement with an outer thread, in particular a left-hand thread, of the fastening screw.

The inner thread of the receptacle for the fastening screw can arise during the injection moulding process by a left-hand thread being insert-molded.

In a mounted state in which the bracket element connects a bicycle frame to the rear gearshift mechanism of the derailleur system, the fastening screw can be screwed into the receptacle for the fastening screw. In this state, the hub axle (e.g., plug-in axle) can extend through the opening or cutout and through the fastening screw.

The receptacle for the fastening screw may protrude at least 5 mm. In an alternate embodiment, the receptable for the fastening screw may protrude at least 10 mm. In a further alternate embodiment, the receptable for the fastening screw may protrude at least 15 mm. The protrusion may be from a surface of that region of the bracket element that is made from metal, the surface facing the receptacle for the fastening screw. This improves engagement of the receptacle in the bracket opening in the bracket portion of the bicycle frame. In addition, a certain length of the receptacle is advantageous for reliably screwing the fastening screw into the receptacle.

The combination of a design of the receptacle in the region made from plastic and the use of a metallic fastening screws makes it possible to make use of the advantages of plastic, for example the simple mouldability and elasticity thereof, and also of metals, for example the high rigidity and abrasion resistance thereof. The susceptibility of the bracket element to faults is thereby reduced.

In addition, in one conceivable embodiment, the bracket element, its region made from plastic, has a spacer which can be placed or is placed lying against the inner side of the associated rear bracket portion in order to position the region made from metal in a defined manner relative to the associated rear bracket portion of the bicycle frame.

The spacer can thereby also determine the position of the rear gearshift mechanism with respect to the sprocket set assigned to the rear wheel. If a thickness of the spacer increases in the axial direction of the opening or cutout, that region of the bracket element which is made from metal and the rear gearshift mechanism fastened thereto move closer to the rear wheel. The spacer can therefore be of significance, when the thickness thereof is appropriately dimensioned, for correct positioning of the rear gearshift mechanism with respect to the sprocket set and the reliability thereof during operation. Furthermore, the realization of the spacer from plastic makes it possible for the latter to be adapted to the respectively selected frame or the respectively selected sprocket set. For example, a bicycle manufacturer or fitter could select the spacer which has the most suitable dimensions from a plurality of bracket elements.

The spacer is arranged in the first portion of the bracket element. The spacer can be arranged between the opening or cutout and the mounting opening. The spacer and the receptacle for the fastening screw can be arranged adjacent to each other or/and can be formed integrally with each other.

Alternatively or additionally to the spacer, the bracket element, its region made from plastic, can have a contact flange which can be placed or is placed in a manner lying against the inner side of the associated rear bracket portion in order to position the region made from metal in a defined manner relative to the associated rear bracket portion of the bicycle frame. The contact flange can be releasably connected to the bracket element, for example can be plugged onto the receptacle of the bracket element.

Instead of the contact flange, the bracket element can have a flange receptacle which can be placed or is placed lying against the inner side of the associated rear bracket portion in order to position the region made from metal in a defined manner relative to the associated rear bracket portion of the bicycle frame.

Both the contact flange and the flange receptacle of the bracket element can facilitate positioning of the bracket element on the associated bracket portion.

In a second aspect, the present disclosure relates to a bicycle which comprises a bicycle frame with a rear wheel which can be driven by a derailleur system and which has a sprocket set of the derailleur system, wherein a chain of the derailleur system that engages with a selected sprocket in a respective selected gear can be transferred between the sprockets of the sprocket set by a rear gearshift mechanism of the derailleur system, wherein the rear gearshift mechanism is connected to the bicycle frame by a bracket element mounted on an inner side of an associated rear bracket portion of the bicycle frame. The bracket element comprises a first portion which has an opening or cutout in which a portion of a bicycle rear wheel axle of the rear wheel is accommodated, and a second portion which has a mounting opening to which a basic element of the rear gearshift mechanism is secured.

The bracket element can be the bracket element described previously according to the first aspect of the disclosure. Alternatively, the bracket element can be formed with at least one region made from plastic and a region made from metal, and the region made from plastic can be releasably connected to the region made from metal.

According to the second aspect of the disclosure, the object is achieved in that the bracket element is secured or can be secured in a frictionally locking manner in a desired position on the associated rear bracket portion and, in the event of application of a rotational force exceeding the frictionally locking holding force, can be rotated out of the desired position in the direction of a stop position in which the bracket element is at a stop against at least one rotational stop of the rear bracket portion.

In this connection, the term "rotatable" means a rotation which should be significantly delimited from simple manufacturing play and is at least 10°. In an alternate embodiment, the rotation is at least 20°. In a further alternate embodiment, the rotation is at least 30°.

The bracket element is rotatable about an axis of rotation, the centre point of which lies in an opening or cutout in the bracket element. This can involve the opening or cutout which receives a portion of a bicycle rear wheel axle.

An alignment of the bracket element in the desired position can differ from an alignment of the bracket element in the stop position by an angle of rotation of approximately 25° to 105°. In an alternate embodiment, the angle of rotation may be approximately 40° to 90°. In a further alternate embodiment, the angle of rotation may be approximately 55° to 75°.

The holding force is provided by surfaces of the bracket element and the bracket portion lying against each other. In the case of the use of a bracket element according to the first aspect of the disclosure, for example, an outer surface of the receptacle for a fastening screw can lie in a form-fitting manner against an inner surface of a bracket opening in the bracket portion, wherein a holding force is provided between the previously mentioned surfaces. In addition or alternatively, a surface of the spacer can lie against a surface of the bracket portion, and therefore a holding force is likewise provided between the surfaces.

The previously discussed rotation can take place, for example, during motion of the bicycle if an obstacle exerts a force on the rear gearshift mechanism. In conventional bicycles in which such a rotation of the bracket element is not possible, this force is transmitted directly to the bracket element, which generally leads to damage to the bracket element or even of the bicycle frame fastened rigidly thereto or/and of the rear gearshift mechanism fastened rigidly thereto. The bracket element according to the disclosure can counteract such damage by at least partially absorbing such a force when the latter is in effect and using same for rotation from the desired position in the direction of the stop position (e.g., in a rearwards rotational movement) of the bracket element.

Also, for example, the bracket element can rotate in relation to the associated rear bracket portion if an object disturbs the operationally provided revolving movement of the chain in such a manner that the chain moves the rear gearshift mechanism out of its operating position and this movement is transmitted to the bracket element connected to the rear gearshift mechanism. If the external dynamic force is greater than the frictionally locking holding force between the bracket element and the associated rear bracket portion, the bracket element can rotate in relation to the associated bracket portion and can therefore counteract damage to the rear gearshift mechanism or to the chain itself.

The frictionally locking holding force also acts during the rotation of the bracket element, in particular during the reverse rotational movement, and therefore the rotational operation requires a certain period of time which, for the cyclist riding the bicycle, remains as a reaction time in which the cyclist can appropriately react to the dynamic force. For example, the cyclist riding the bicycle can adjust pedalling or a chain drive and/or can manually eliminate the force acting on the bracket element. In the event of an active or passive elimination of the obstacle or of the force exerted on the rear gearshift mechanism, the rotation can be stopped before the bracket element is in the stop position (a second stop position) in which the bracket element is at a stop against at least one rotational stop of the rear bracket portion. Otherwise, the rotation can be continued until the bracket element is in the stop position (second stop position).

The stop position can be any desired stop position in which the rotation of the bracket element in the direction of the direction of rotation is stopped. The rotation of the bracket element brings about equally a rotation of the rear gearshift mechanism and an associated increase in the revolving path of the chain. During a rotation of the bracket element in the direction of the stop position, a chain tension increases. The stopping of the rotation of the bracket element in the stop position prevents a chain tension leading to damage. The stop position (second stop position) is therefore configured in such a manner that damage to the rear gearshift mechanism or/and to the chain itself is prevented because of the chain tension caused by the rotation of the bracket element.

It is generally proposed that the rear bracket portion has two rotational stops, a forwards rotational stop and a rearwards rotational stop, wherein the bracket element is at a stop against the forwards rotational stop in a first stop position corresponding to the desired position, and, in the event of the application of the rotational force exceeding the frictionally locking holding force, can be rotated into a second stop position (previously referred to merely as the stop position) at a stop against the rearwards rotational stop.

In the mounted state, the forwards rotational stop limits a rotation of the bracket element in the forwards direction of rotation of the bracket element and, in the mounted state, the rearwards rotational stop limits a rotation of the bracket element in a rearwards direction of rotation of the bracket element.

The bracket element is designed according to the first aspect of the disclosure and the bracket element advantageously has the first stop formation of the bracket element, which stop formation strikes against a mating stop formation of the forwards rotational stop in the first stop position, wherein the first stop formation can be formed by the region made from plastic.

In the case of such a design of the first stop formation, the simple moldability of plastic and the elastic property thereof can be used. The former permits precise adaptation of the stop formation of the bracket element to the mating stop formation of the forwards rotational stop, and the latter can avoid damage to the frame and to the bracket element when the first stop formation of the bracket element strikes against the mating stop formation of the forwards rotational stop.

The first stop formation is a first stop surface. The first stop surface can be formed by the axially protruding collar of the bracket element according to the first aspect, for example can be an outer edge surface of the axially protruding collar, the edge surface pointing away from the bracket element. The first stop formation can also be arranged on the protrusion formed by the collar.

A contact surface between the first stop formation of the bracket element, the stop formation striking against the forwards rotational stop in the first stop position, and the mating stop formation of the forwards rotational stop of the bracket portion may be at least 10 mm$^2$.

The contact surface prevents rotation of the bracket element in the forward direction of rotation and beyond the forward rotational stop, for example during the mounting. The contact surface is of a sufficient size in order to provide a holding force which prevents an undesirable rotation of the bracket element and which is greater than a rotational force, which can be expected during operation and acts on the bracket element, in the forwards direction of rotation. During the operation of the bicycle, the bracket element is pretensioned in the direction of the first stop position by a chain tension of the bicycle chain of the derailleur system.

The bracket element may be designed according to the first aspect having a second stop formation which strikes against a mating stop formation of the rearwards rotational stop in the second stop position, where the second stop formation may be formed by the region made from plastic.

The advantageous effects mentioned above with regard to the first stop formation are produced analogously for the second stop formation.

The second stop formation is a second stop surface. The second stop surface can be formed by the axially protruding collar, for example can be an outer edge surface of the collar, the edge surface pointing away from the bracket element. The second stop formation can also be arranged on the protrusion formed by the collar.

The first stop formation can be arranged adjacent to the second stop formation. For example, in the event of the first and second stop formation being designed as a first and second stop surface respectively, an angle between the first stop surface and the second stop surface can be between 70° and 120°.

It can be provided that a depression, for example an edge or a slope thereof, in the associated bracket portion or a projection projecting from the latter forms the mating stop formation of the forwards rotational stop.

The first stop formation, or the first stop surface, of the bracket element can lie in a form-fitting manner against the mating stop formation of the forwards rotational stop, against an edge of the forwards rotational stop of the bracket portion. A surface of the edge can extend at a right angle to the adjoining surfaces or can be designed as an oblique surface.

The depression in the associated bracket portion or the projection protruding from the latter forms the mating stop formation of the rearwards rotational stop.

The mating stop formation of the forwards rotational stop and the mating stop formation of the rearwards rotational stop are formed by a common projection or by a common depression on the bracket portion.

Alternatively, the mating stop formation of the forwards rotational stop can be a first edge surface of the depression or of the projection or/and the mating stop formation of the rearwards rotational stop can be a second edge surface of the further depression or of the further projection.

The second stop formation, or the second stop surface, of the bracket element can lie in a form-fitting manner against the mating stop formation of the rearwards rotational stop, against an edge of the rearwards rotational stop of the bracket portion. A surface of the edge can extend at a right angle to the adjoining surfaces or can be designed as an oblique surface.

The projection can be formed integrally with the bracket portion or can be screwed or screwable onto the latter.

In a development of the disclosure, the bracket element can form a diverting surface region on which a chain can slip transversely with respect to its longitudinal extent in a direction pointing away from the inner side of the associated rear bracket portion.

The diverting surface region can be designed in accordance with the diverting surface region of the first aspect of the disclosure. In the case of an oblique diverting surface, the latter can be oblique with respect to a flat surface of the bracket element, wherein the oblique diverting surface falls obliquely in a direction pointing away from the inner side of the associated rear bracket portion.

In general, the bracket element in the state in which it is mounted on the inner side of the associated rear bracket portion of the bicycle frame can extend into a space between a smallest sprocket of the sprocket set of the rear gearshift mechanism and the inner side of the associated rear bracket portion. The extent is such that a distance between the smallest sprocket and the bracket element prevents jamming of the chain inbetween. In other words, the distance is smaller than the width or thickness of a chain link of the chain.

In a third aspect, the present disclosure relates to a bicycle, according to the second aspect of the disclosure, which comprises a bicycle frame with a rear wheel which can be driven by a derailleur system and which has a sprocket set of the derailleur system, wherein a chain of the derailleur system that engages with a selected sprocket in a respective selected gear can be transferred between the sprockets of the sprocket set by a rear gearshift mechanism of the derailleur system, where the rear gearshift mechanism is connected to the bicycle frame by a bracket element mounted on an inner side of an associated rear bracket portion of the bicycle frame, where the bracket element comprises a first portion which has an opening or cutout in which a portion of a bicycle rear wheel axle of the rear wheel is accommodated, and a second portion which has a mounting opening to which a basic element of the rear gearshift mechanism is secured.

The bracket element can be the bracket element described previously according to the first aspect of the disclosure. Alternatively, the bracket element can be formed with at least one region made from plastic and a region made from metal, and the region made from plastic can be releasably connected to the region made from metal.

According to the third aspect of the disclosure, the object is achieved in that the bracket element is realized, on at least one outer edge region, with a diverting surface region on which the chain can rest when the chain has sprung from a sprocket of the sprocket set beyond the axial region of the sprocket set in the direction of the bracket element and can then slide in the direction of the smallest sprocket in order to restore the engagement of the chain with the sprocket of the sprocket set or to contribute thereto.

In other words, the chain can automatically enter again into engagement with a sprocket, optionally the smallest sprocket, and/or can be brought again into engagement with a sprocket, optionally the smallest sprocket, at least by the rear gearshift mechanism.

Therefore, in a fault state in which the chain is not in engagement with one of the sprockets of the sprocket set, the diverting surface region can cause a movement of the chain in the direction of a sprocket (e.g., the smallest sprocket of the toothed ring) such that the normal state in which the chain is in engagement with one of the sprockets of the toothed ring is restored. The fault state can therefore be eliminated without the cyclist riding the bicycle having to interrupt his/her journey.

As explained in more detail later on, the diverting surface region can comprise a substantially flat diverting surface, a convex diverting surface or a concave diverting surface. The diverting surface region can also comprise a combination of the previously mentioned configurations of diverting surfaces.

It is particularly considered that a distance between an outer surface of the bracket element, which outer surface points in the direction of the sprocket set, and the smallest sprocket is such that the chain cannot be jammed in-between. The outer surface pointing in the direction of the sprocket set is the surface which protrudes the furthest in this direction.

Such a configuration avoids a fault state which is caused by a jammed chain and which can be eliminated only during an interruption of the journey on the bicycle. For this purpose, a bicycle manufacturer or fitter can select, for example, a bracket element according to the first aspect which permits the desired distance. The selection can take place individually for each bicycle and can depend on the selected bicycle frame and on the selected sprocket set and the manufacturing tolerances thereof.

It is generally provided that, with respect to a centre point of an opening or cutout of the bracket element, a radial level of a first edge, which is closest to the sprocket set, of the diverting surface region lies at the radial level of a tip diameter of the smallest sprocket of the sprocket set or is offset radially inwards in relation thereto.

The inwardly offset radial level of the first edge of the diverting surface region from the tip diameter of the smallest sprocket permits slipping of the chain along the diverting surface region until it enters into engagement with a sprocket.

The first edge of the diverting surface region can have a rectilinear and/or a curved profile. The curved profile of the edge can be adapted at least in sections to the rounding of the smallest sprocket.

Furthermore, the diverting surface region has a second edge which is closer to the associated rear bracket portion than the first edge and is offset outwards with respect to the radial level of the first edge.

The edges can be arranged in such a manner that an imaginary extension which intersects the two edges of the diverting surface region and runs in the direction of the smallest sprocket likewise intersects the peripheral surface of the smallest sprocket, which peripheral surface is defined by the tip diameter of the smallest sprocket of the sprocket set, or intersects the smallest sprocket within the tip circle. This geometrical configuration of the edges with respect to the smallest sprocket permits an effective bringing of the chain and the smallest sprocket into engagement again by the diverting surface region.

The surface between the first and the second edge is substantially planar or curved substantially concavely or curved substantially convexly or has a combination of one or more of the shapes mentioned. This permits slipping of the chain in the direction of the smallest sprocket without parts of the bicycle frame being damaged.

A maximum distance between the first and the second edge may be, as measured in top view, approximately between 2 mm and 10 mm. In an alternate embodiment, the maximum distance between the first and the second edge may be between 4 mm and 8 mm. In a further embodiment, the maximum distance between the first and the second edge may be between 5 mm and 6 mm.

The bracket element may include two separately formed diverting surface regions which are arranged at different rotational angles with respect to a centre point of a opening or cutout of the bracket element.

In the operating state, the chain is guided at least about a front sprocket wheel and a sprocket of the rear sprocket set. A differentiation is made here between the load side of the chain, which is the pulled chain side which is pretensioned by the forces introduced into the chain at the front sprocket wheel, and the return side of the chain, which is the loose side of the chain. One of the two diverting surface regions is located adjacent to the load side and the other adjacent to the return side. Such an arrangement increases the probability that a chain link will be diverted by one or both of the diverting surface regions to a sprocket (e.g., the smallest sprocket) and will enter into engagement therewith. A fault state is therefore prevented even more effectively, for example even in the event of unusual chain movements, as may occur off-road.

The two diverting surface regions can be arranged at different radial levels with respect to the centre point of the opening or cutout. For example, one of the two diverting surface regions which points in the direction of a return side of the chain is arranged at a radially greater level.

The operational purpose of the diverting surfaces will be explained in more detail below. The starting point is a situation in which the chain is not in engagement with the rear sprockets. The diverting surface region adjacent to the load side of the chain serves to allow the chain to slip in the direction of the smallest sprocket, i.e. away from the components of the bicycle frame. Jamming of the chain against the bicycle frame is therefore intended to be avoided, as a result of which the sliding movement of the chain in its longitudinal direction is furthermore permitted and the forces can be transferred from the load side of the chain as far as to the position at which chain links of the chain are in contact with the diverting surface region adjacent to the return side of the chain.

The diverting surface region adjacent to the return side of the chain can serve to allow the chain to slip in the direction of a sprocket tooth of the smallest sprocket. Since the chain present there belongs to the return side of the chain, the chain is pretensioned there starting from the chain guide, as a result of which favourable conditions can be produced for the reengagement of chain links of the chain with the smallest sprocket.

Whenever a contact line or a contact point of an outer edge of an outer link plate of a chain link of the chain, with the diverting surface region adjacent to the return side, is located at a radial level which corresponds to a radial level of a tip diameter of the smallest sprocket or of a tooth tip edge of a tooth tip of a sprocket tooth of the smallest sprocket, the tooth tip edge being further away from the bracket element, an inner edge of an inner link plate of a chain link adjacent to the chain link, the inner link plate being further away from the bracket element, can lie at the same axial level as a tooth tip edge determining the tip diameter or the tooth tip edge further away from the bracket element, or can be at a greater axial distance from the bracket element than the tooth tip edge.

One condition for the reengagement of the chain links in tooth intermediate spaces of sprocket teeth of the smallest sprocket can consequently be that an inner edge of an inner link plate (of a link plate further away from the bracket element) of a pair of inner link plates of a chain link is located on a tooth tip edge (of a link plate further away from the bracket element) of a tooth tip of a sprocket tooth of the smallest sprocket. The engagement of the tooth tip can take place both at a pair of inner link plates of a chain link and at a pair of outer link plates of a chain link. The space available for the engagement of a sprocket tooth is greater in the case of a pair of outer link plates than in the case of a pair inner link plates.

As a result of the action of the diverting surface region adjacent to the return side, a portion of the chain again runs in engagement with the smallest sprocket after a tooth tip has engaged in the intermediate space formed by a pair of inner or outer link plates. Consequently, the radial level of the diverting surface region adjacent to the return side should be selected in such a manner that, when an outer link plate of a chain link of the chain lies against the diverting surface region, the inner edge of an inner link plate (a link plate further away from the bracket element) can lie against a tooth tip of the smallest sprocket. In an alternate embodiment the inner edge of the inner link plate (the inner link plate further away from the bracket element), the uppermost corner thereof, makes contact with the tooth tip edge or a surface of the tooth tip edge that points away from the bracket element, or with the tooth tip point.

For an exact relative positioning of the bracket element with respect to the bracket portion, the bicycle furthermore has a contact flange which is connectable or is connected to the bracket element or is formed by the latter. Alternatively, the contact flange can be connectable or can be connected to the bracket portion or can be formed by the latter.

For this purpose, a contact surface of the bracket element, the contact surface pointing towards the bracket portion, can lie against a mating contact surface of the bracket portion, where a configuration formed from the contact surface and the mating contact surface is formed on the contact flange.

The contact surface and the mating contact surface may have mutually corresponding configurations, as a result of which exact positioning is possible. This can furthermore take place by the contact surface and mating contact surface being true to scale.

The contact flange can protrude with the contact surface from the bracket element and the mating contact surface can be formed by the bracket portion and can be reset in relation to an adjacent surface of the bracket portion. The contact flange can engage in a depression forming the mating contact surface. It goes without saying that, for exact positioning, the depression and/or the contact flange can be produced particularly precisely dimensionally.

The mating contact surface may have, for example, no paintwork or paintwork with a smaller layer thickness than that of a bracket portion surface adjacent to the mating contact surface. The depression could thereby be undertaken substantially by the thickness of the paint application or the coating of the surface of the bracket portion. A complicated adaptation of the contour of the rear bracket portion during the manufacturing of the bicycle frame with the bracket portion would therefore not be necessary.

FIG. 1 shows a perspective view of a bracket element 1 according to the disclosure which includes a plastic region 2 and a metal region 3. In the embodiment, the plastic region 2 is fixedly connected to the metal region 3, but a non-connected illustration of the two regions 2, 3 is shown in FIG. 1 for the purpose of clarity. An illustration in which the two regions 2, 3 are connected to each other is apparent in FIG. 2. The bracket element 1 connects a bicycle frame 4 to a rear gearshift mechanism 5 of a derailleur system, as is apparent, for example, in FIG. 5. In order to provide this connection, the bracket element 1 includes a first portion which has an opening or cutout 6 for receiving a portion of a bicycle rear wheel axle, for example a plug-in axle. Furthermore, the bracket element 1 includes a second portion which has a mounting opening 7 to which a basic element of the rear gearshift mechanism 5 can be secured.

As is apparent in FIG. 1, the metal region 3 can be formed in a lug-shaped manner and can form both the cutout 6 and the mounting opening 7. In order to mount the rear gearshift mechanism 5 on the bracket element 1, a screw-in sleeve 8 can be introduced into the mounting opening 7 and, for example, held therein by a press fit configuration. The screw-in sleeve 8 can have a projecting edge on one side, and therefore screwing in the rear gearshift mechanism 5 on the side opposite the edge can lead to a fixed connection between the bracket element 1 and the rear gearshift mechanism 5.

In order to mount the bracket element 1 illustrated in FIGS. 1 and 2 on an inner side of an associated rear bracket portion 9 of the bicycle frame 4 the bracket element 1 can be connected to the rear bracket portion 9 by a receptacle 10 which is formed in alignment with the opening or cutout 6. For this purpose, the receptacle 10 can be brought into a form-fitting connection with a bracket opening 11 in the rear bracket portion 9, as is apparent, for example, in FIG. 3.

When the receptacle 10 is realized from the plastic region 2, it is recommended to support the plastic region 2 with a material, the strength and abrasion resistance of which are greater than that of plastic. This can take place, for example, with a fastening screw 12 which is introduced into the receptacle 10 and extends through the receptacle 10 and optionally into the opening or cutout 6. A connection between the fastening screw 12 and the receptacle 10 can take place by a screw connection, wherein an external thread of the fastening screw 12 engages in an internal thread of the receptacle 10. The fastening screw 12 can therefore be screwed into the receptacle 10.

The threaded connection provided for screwing the fastening screw 12 into the receptacle 10 may be a left-hand thread. This can be of advantage for the mounting of the rear wheel on the bicycle frame 4 by a plug-in axle. In the example, when the fastening screw 12 is screwed into the receptacle 10, the fastening screw 12 can be rotated anti-clockwise. During subsequent fitting in of the plug-in axle which extends through the fastening screw 12, there can be a certain frictional force between an outer surface of the plug-in axle and an inner surface of the fastening screw 12. Rotation of the plug-in axle can be at least partially transmitted to the fastening screw 12. By using the left-handed thread, loosening of fastening screw 12 the from the plug-in axle can be avoided. Instead, the screwing in of the plug-in axle can also lead to fastening of the fastening screw 12 in the receptacle 10.

In a further embodiment, the left-handed thread can be realized with two thread leads, which can keep fastening screw 12 from being tightened too firmly into the receptacle 10 due to the greater thread pitch. The greater threaded pitch here can help the fastening screw 12 not to be tightened too firmly.

For a uniform force distribution of the force to be transmitted from the head of the fastening screw 12 to the rear bracket portion 9, a plain washer 13 can be introduced between the head of the fastening screw 12 and the receptacle 10 and in a manner lying against the rear bracket portion 9.

After the bracket element 1 is mounted on the rear bracket portion 9, the receptacle 10 can completely fill the bracket opening 11 in the rear bracket portion 9 and the bracket opening 11 can border the plain washer 13 or the head of the fastening screw 12 on one side, and the first portion of the bracket element 1 on the other side.

In one possible exemplary embodiment of the bracket element 1, that region of the bracket element 1 which lies against the inner side of the rear bracket portion 9 can be formed from the plastic region 2. In an embodiment, during the production of the bracket element 1, the region can be realized in differing thicknesses and can act as a spacer 14 which positions the metal region 3 in a defined manner relative to the associated rear bracket portion 9 of the bicycle frame 4.

For the mounting of the rear wheel, for example, by a plug-in axle, the plug-in axle should be guided at least through the fastening screw 12 and a rear wheel hub 15 connected to a rear wheel, as is apparent, for example, in FIG. 3. Consequently, during this mounting, the plug-in-axle guide 16 formed by the rear wheel axle can be oriented in alignment with the cutout 6 and with a through opening of the fastening screw 12. In order to facilitate this orientation, the bracket element 1 can have a collar 17 which projects axially, for example, in the direction of the rear wheel hub 15 and which can have a guide opening or guide cutout 18. The guide opening or guide cutout 18 which is illustrated in a U shape in the present case can be designed in such a manner that a sleeve of the plug-in-axle guide 16 of the rear wheel hub 15 can slide along surfaces of the guide opening or guide cutout 18 until the sleeve lies in the curvature of the U shape. As a result, an aligned orientation of the plug-in-axle guide 16 with the opening or cutout 6 can be achieved.

The bracket element 1 can have a diverting surface region 19, 20 which can be bounded at least by a first edge 21 and an opposite second edge 22. The diverting surface region 19, 20 between the first edge 21 and the second edge 22 is designed, for example, in a manner dropping in the direction of a sprocket set 23, as is apparent in FIG. 3. Although the bicycle chain is not illustrated in FIG. 3 for reasons of better clarity, it is clearly understood that, in the case of a bicycle capable of functioning, such a bicycle chain is in engagement with a sprocket of the sprocket set 23 and, prior to the deflection of the sprocket set 23 about one of the sprockets, runs in a direction perpendicular to the plane of illustration.

In a fault state, for example, if a shifting operation takes place for changing the gear, i.e. when the chain is switched over from one sprocket to another sprocket, or in the event of a malfunction due to environment influences, for example bushes in a forest area, the chain can be disengaged from the sprockets of the sprocket set 23. The gravitational force and the chain tension can cause the chain in such a fault state to move in the direction of the rear bracket portion 9 and, in the process, may make contact with the diverting surface region 19, 20. In such a case, the chain which is disengaged from the sprocket set 23 and has come into contact with the diverting surface region 19 can slip transversely with respect to its longitudinal direction, which is perpendicular with respect to the plane of the illustration, in the direction of the sprocket set 23 and can therefore enter again into engagement with a sprocket, such as the smallest sprocket 24 of the sprocket set 23. For this purpose, two diverting surface regions 19, 20 are provided which are both configured to permit slipping of the chain transversely with respect to its longitudinal extent in the direction of the sprocket set 23.

The diverting surface region 19, 20 can therefore eliminate a fault state of the bicycle within a short time without manual intervention. This can take place if, in addition or alternatively, jamming of the chain between an outer surface 26 of the bracket element 1 and the smallest sprocket 24 is avoided. The outer surface 26 may point in the direction of the sprocket set 23. For this purpose, a distance 25 between the outer surface 26 of the bracket element 1 and the smallest sprocket 24 can be such that the chain cannot pass in between. The distance 25 can be varied, for example, by the design of the spacer 14. For example, a thicker configuration of the spacer 14 with the bracket element 1 would move the outer surface 26 further in the direction of the smallest sprocket 24, i.e. would reduce the distance 25.

In the exemplary embodiment, the diverting surface region 19, 20 is formed from plastic. This is an advantageous design since plastic can be very readily moulded and can therefore be adapted to different sprocket sets and bracket portions. In an alternate embodiment, a design is possible in which the diverting surface regions 19, 20 are formed from the metal region 3.

When considered somewhat more precisely, engagement of a chain with a sprocket of the sprocket set 23 means engagement of a sprocket tooth 50 between a pair of inner link plates 51 or a pair of outer link plates 52 of a chain, which link plates are illustrated schematically with reference to four chain links in FIG. 4a. In the operating state, the chain runs at least around a front sprocket wheel and a sprocket of the sprocket set 23 and can be divided into portions, what are referred to as sides (load side and return side) in accordance with the forces acting on the chain. In the example illustrated in FIG. 3, one of the diverting surface regions 19 may be adjacent to the load side and another diverting surface region 20 may be adjacent to the return side. FIG. 4b illustrates the diverting surface region 20 on an enlarged scale in order to more precisely explain the function of diverting surface region 20.

FIG. 4b shows a state in which the chain lies with an outer link plate 53 closer to the bracket element 1. The outer edge of said outer link plate of the chain lies against the diverting surface region 20 which is adjacent to the return side, and makes contact with the diverting surface region at a contact line or a contact point 54. An inner link plate 55 (which is further away from the bracket element 1) may contact the sprocket tooth 50 with a tooth tip edge 56. The tooth tip edge 56 can furthermore be configured as an elongate point, and the inner link plate 55 can then be in contact with the point.

The contact line or the contact point 54 can be on a radial level 57 which corresponds to a radial level 57 of a tip diameter of the smallest sprocket or a tooth tip edge 56. Furthermore, the inner edge of an inner link plate 55 of a chain link 51 (adjacent to the chain link 52) can lie on the same axial level 58 as a tooth tip edge 56 determining the tip diameter or the tooth tip edge 56, and the inner edge of an inner link plate 55 may be further away from the bracket element 1 or may have a greater axial distance from the bracket element 1 in relation to said tooth tip edge 56. That is to say, the tooth tip edge 56 can rest on the inner link plate 55, wherein, the tooth tip edge 56 can lie against an inner edge of the inner link plate 55, which inner edge is further away from the bracket element 1, as shown in FIG. 4b. The diverting surface region 20 adjacent to the return side can therefore permit sliding of a sprocket tooth 50 between a pair of inner link plates 51 and also between a pair of outer link plates 52, as a result of which the chain can enter into engagement again with the smallest sprocket 24.

The above explanations show that diverse forces can act on the plastic region 2 during mounting and/or during use of the bicycle with the bracket element 1. For increased safety, it is therefore recommended to take care that, during the various dynamic forces on the plastic region 2, the fixed connection discussed at the beginning between the plastic region 2 and the metal region 3 is always ensured. In order to achieve this specification, the plastic region 2 may be injection molded around the metal region 3. Alternatively, the metal region 3 may have one or more through holes or recesses 27 which can be filled with plastic 28 which belongs to the plastic region 2. During the injection molding, the plastic can flow into the through holes or recesses, can fill them and can ensure a fixed connection of the two regions 2, 3 after the cooling of the plastic. In the exemplary embodiment illustrated in FIGS. 1 and 2, two through holes 27 are provided in the metal region 3. The through holes are filled with parts 28, which have flowed into them, of the plastic region 2.

A bicycle will be described below, the bicycle frame 104, 204, 304, 404 and the bracket element 101 which connects the bicycle frame 104 to a rear gearshift mechanism 105 of a derailleur system are configured such that damage to the previously mentioned parts in diverse fault situations can be avoided.

The bracket element 101 is also the bracket element 1 described previously. Alternatively, it can be a bracket element which is constructed substantially like the bracket element 1, but in which the plastic region 2 can be releasably connected to the metal region 3. Components or parts which are present both in the bracket element 1 and in the bracket element 101 and/or interact therewith are referred to below by reference signs incremented by 100. The previously described explanations continue to apply, unless mentioned otherwise, and will not be repeated once again.

The bicycle, apart from its bicycle frame 104 and bracket element 101, can be a bicycle which is known from the prior art and which has a rear wheel which can be driven by a derailleur system, wherein a rear wheel hub 15 which is connected to the rear wheel has a sprocket set 23 of the derailleur system. In accordance with the gear respectively selected by the operator, the chain is in engagement with a selected sprocket of the sprocket set 23 and can be moved between the sprockets of the sprocket set 23 by the derailleur system, for example by a specific movement of the rear gearshift mechanism 105.

The bracket element 101 has a cutout 6, in which a portion of a bicycle rear wheel axle of the rear wheel is accommodated. The bracket element 101 has a mounting opening 7 to which a basic element of the rear gearshift mechanism 105 is secured. In the exemplary embodiments, the bracket element 101 is connected to the rear gearshift mechanism 105 and an inner side of an associated rear bracket portion 109 of the bicycle frame 104.

Figure 5B:
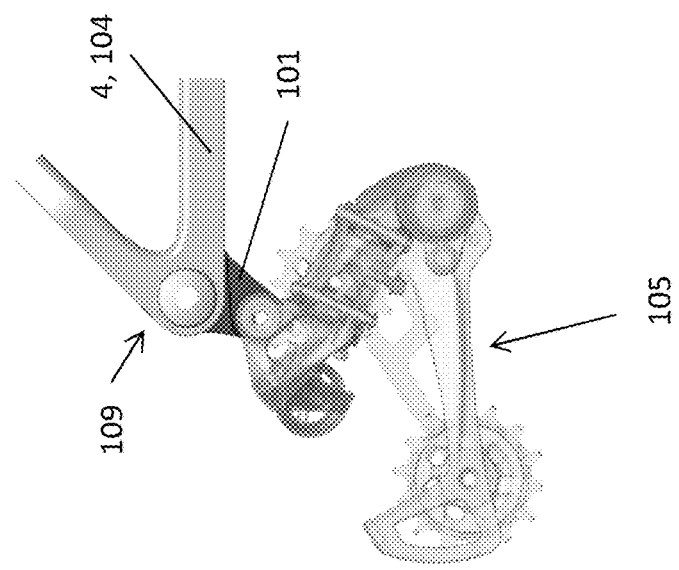
FIG. 5b shows a bracket element connecting a frame and a rear gearshift mechanism in a first stop position or desired position of the bracket element with a bracket portion of the frame as viewed from an outer side of the bracket portion
Figure 5A:
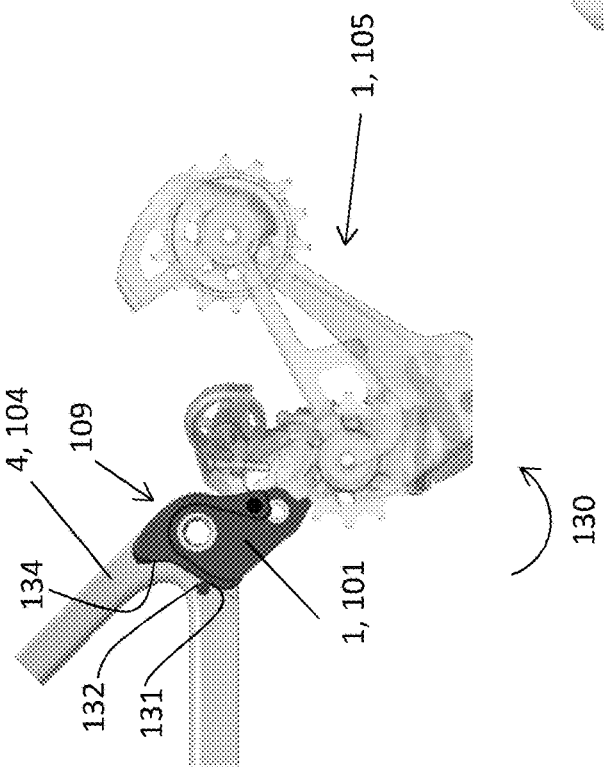
FIG. 5a shows a bracket element connecting a frame and a rear gearshift mechanism in a first stop position or desired position of the bracket element with a bracket portion of the frame as viewed from an inner side of the bracket portion.
Figure 5C:
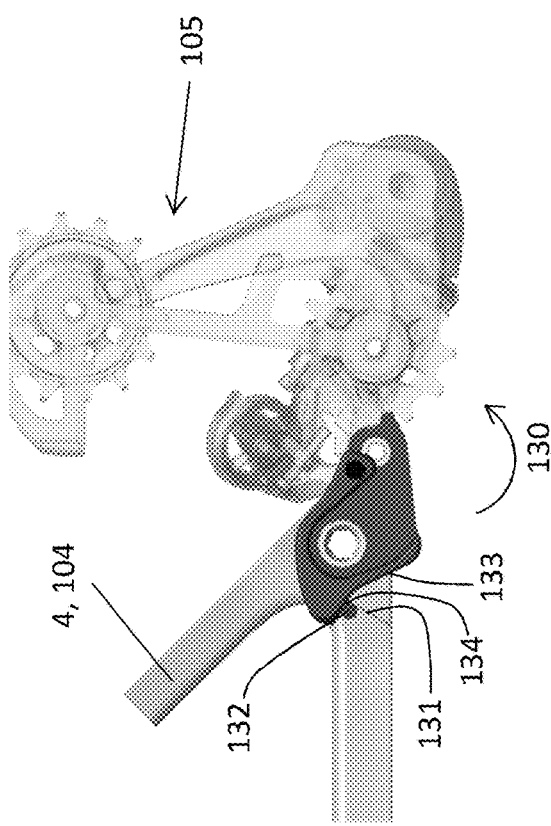
FIG. 5c shows a bracket element connecting a frame and a rear gearshift mechanism in a second stop position or desired position of the bracket element with a bracket portion of the frame as viewed from the inner side of the bracket.

FIG. 5 shows how the previously described damage to the rear bracket portion 109, the bracket element 101 and the rear gearshift mechanism 105 can be avoided. In the example embodiment illustrated in FIGS. 5a and 5c, the forces transmitted to the rear gearshift mechanism 105 by the chain are not taken into consideration, and therefore the position of small chain-guiding and chain-tensioning rolls of the rear gearshift mechanism 105 may differ in reality from the illustrations in FIGS. 5a and c.

In a normal operating state, the bracket element 101 is in a desired position which is apparent in FIGS. 5a and 5b and in which the bracket element 101 is secured or can be secured in a frictionally locking manner to the associated rear bracket portion 109. The frictional fastening of the bracket element 101 can take place using a fastening screw 12, which is guided from an outer side of the rear bracket portion 109 through a bracket opening 111 thereof and through the opening or cutout 6 of the bracket element 101, and engages in a receptacle. For example, the previously described fastening of the fastening screw 12, the plain washer 13 and the receptacle 10 can be used.

Figure 3B:
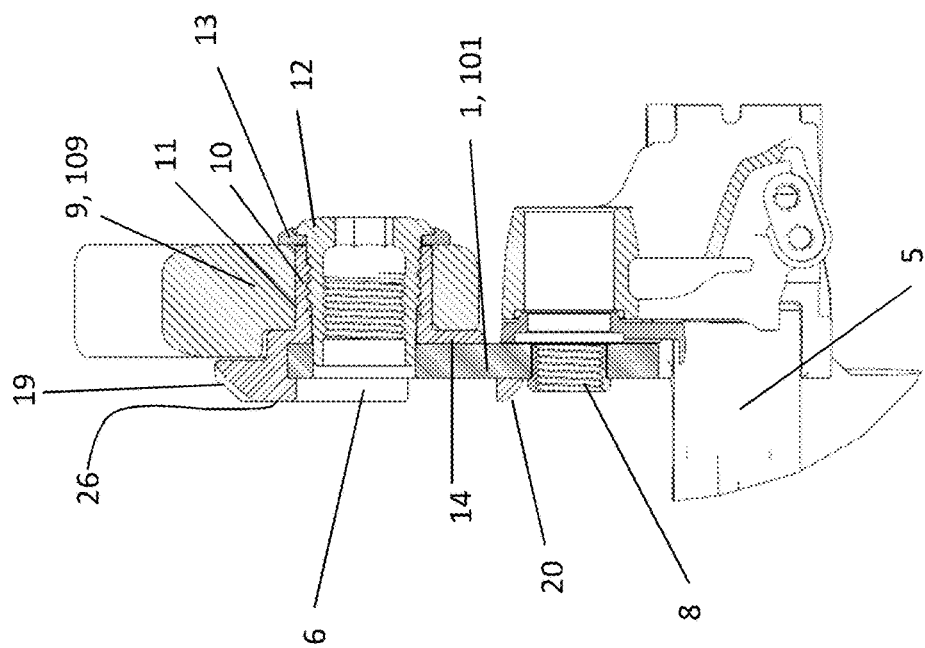
Figure 3A:
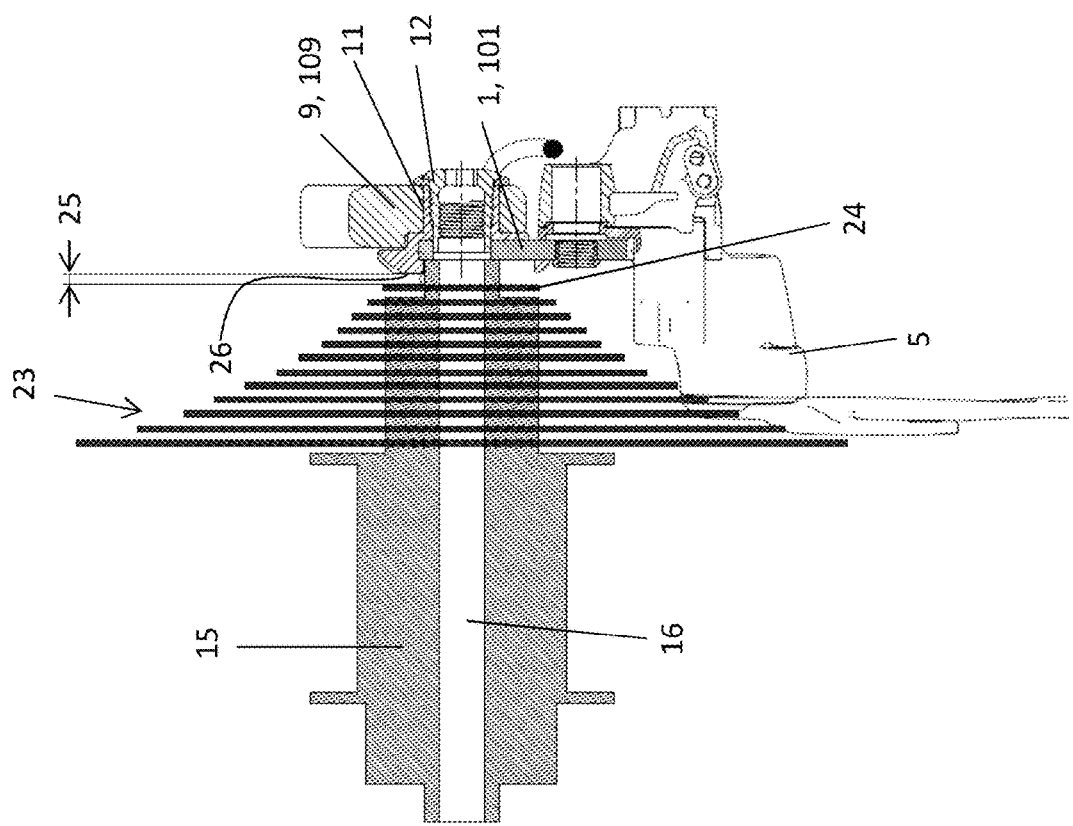
FIG. 3a shows a sectional view of an assembly comprising a rear wheel hub, a sprocket set, a bracket element, a fastening screw, a plain washer, a screw-in sleeve and a rear gearshift mechanism, in a mounted state.

As is best apparent in FIGS. 3a and 3b, a frictionally locking retaining force between the rear bracket portion 109 and the bracket element 101 can therefore be produced between surfaces of the two elements lying against each other. When the previously described bracket element 1 is used, for example, the outer surface of the receptacle 10 and that surface of the spacer 14 which faces the rear bracket portion 9 lie in a frictionally locking manner against the rear bracket portion 9, 109 and can therefore provide a frictionally locking holding force between the rear bracket portion 109 and the bracket element 101.

In the event of application of a rotational force exceeding the frictionally locking holding force in the direction of the arrow 130 (in the anticlockwise direction in FIGS. 5a, c), the bracket element 101 is rotatable with respect to the bracket portion 109 starting from the desired position (first stop position) illustrated in FIGS. 5 a,b in the direction of a stop position (second stop position) illustrated in FIG. 5c. Although a complete rotation as far as the second stop position is illustrated in FIG. 5c, the rotation can also stop in a position not illustrated, between the desired position illustrated in FIG. 5a and the second stop position illustrated in FIG. 5c.

The angle of rotation of the bracket element 101 can be limited by two rotational stops 131, 132. One of the rotational stops is a forward rotational stop 131 and the other is a rearward rotational stop 132. The forwards rotational stop 131 can permit a forward rotation (i.e. rotation in the clockwise direction in FIG. 5a) of the bracket element 101 until the bracket element 101 is in a first stop position. In practice, the forward rotational stop 131 can serve as a positioning aid during the mounting of the bracket element 101 on the bracket portion 109 and can permit a defined positioning of the two elements with respect to each other.

The rearward rotational stop 132 can limit rotation in the direction 130 in the event of the application of the rotational force exceeding the frictionally locking holding force. FIG. 5c shows the bracket element 101 in the second stop position, stopped against the rearward rotational stop 132. The rearward rotational stop 132 prevents a rotation of the bracket element 101, the rotation leading to damage of the rear gearshift mechanism 105 caused by an increased chain tension arising because of the rotation of the rear gearshift mechanism 105 fastened to the bracket element 101.

In the first stop position, as shown in FIG. 5a, a stop formation 133 of the bracket element 101 lies against a mating stop formation of the forward rotational stop 131. In the second stop position, as shown in FIG. 5c, a second stop formation 134 of the bracket element 101 lies against the mating stop formation of the rearward rotational stop 132.

The bracket element 1 previously described may have the abovementioned stop formations as the first stop formation 33 and second stop formation 34 and, when the bracket element 1 is used, the first stop formation 33, 133 and/or the second stop formation 34, 134 is formed from the plastic region 2. The stop formations 33, 34, 133, 134 can thereby be adapted to the corresponding mating stop formations by the easily moldable plastic. Striking of stop formation and mating stop formation against each other can be damped by the elastic property of the plastic. As is apparent in FIG. 1, the first stop formation 33, 133 and/or the second stop formation 34, 134 can be formed from the axially protruding collar 17.

Exemplary embodiments of the bracket portion with various alternative designs of the rotational stops 131, 132, 231, 232, 331, 332, 431, 432 will be described below. The reference signs of each exemplary embodiment are each incremented by 100. The previously described functionalities of the components or parts correspond to the previous explanations and will not be repeated once again.

All of the exemplary embodiments of a rear bracket portion 209, 309, 409 which are described below and are shown in FIGS. 6 to 15 have a bracket opening 211, 311, 411 for fastening a bracket element 201, 301, 401 thereto.

FIGS. 6 to 11 illustrate the rear bracket portion 209 according to a first exemplary embodiment in which a mating stop formation of a forward rotational stop 231 is formed on an edge of a depression 235 of the rear bracket portion 209, and a mating stop formation of a rearward rotational stop 232 is formed on a projection 238 connected to the rear bracket portion 209.

A first possible configuration of the depression 235 is shown in FIG. 6 in which an edge of the depression 235 can have a rectilinear profile in a first subsection 236 and can have a curved profile around the bracket opening 211 in an adjoining second subsection 237. The first subsection 236 and the second subsection 237 merge into each other without an offset or with a slight offset. The mating stop formation of the forward rotational stop 231 is formed by the first subsection 236 of the edge of the depression 235 with a rectilinear profile.

As is apparent in FIG. 6, round projection 238, 239 is connected integrally/fixedly to the rear bracket portion 209, and can form the mating stop formation of the rearward rotational stop 232. The projection 238, 239 is adjacent to the edge of the depression 235, which may also be adjacent to the transition region between the first subsection 236 and the second subsection 237.

FIG. 7 shows the rear bracket portion 209, illustrated in FIG. 6, with the bracket element 201 fastened thereto. FIG. 7a illustrates a view of an inner side of the bracket portion 209. In the example, the bracket element 201 is in the first stop position or desired position with the rear bracket portion 209. Furthermore, it is apparent that the first stop formation 233 of the bracket element 201 (formed by the edge of the depression 235) is located against the mating stop formation of the forwards rotational stop 231. A rear view of the bracket portion 201 fastened to the bracket portion 209 is illustrated in FIG. 7b.

The position of the bracket element 201 after the bracket element 201 has been rotated in the reverse direction of rotation 230 (into the second stop position) is illustrated in FIG. 7c. In the second stop position, the second stop formation 234 of the bracket element 201 is located against the mating stop formation of the rearwards rotational stop 232. The mating stop formation is formed by the projection 238, 239. Part of the bracket element 201 which provides the second stop formation 234, such as on a protrusion 242 thereof, projects beyond the depression 235. Such a protrusion 242 can also be provided by the bracket element 1 described at the beginning by its axially protruding collar 17.

Figure 8B:
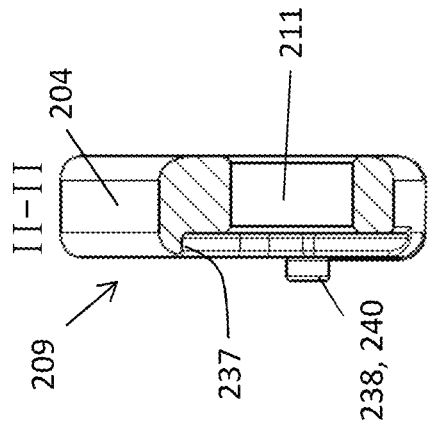
FIG. 8b shows a sectional view formed along line II-II in FIG. 8a of the rear end of the frame.
Figure 9B:
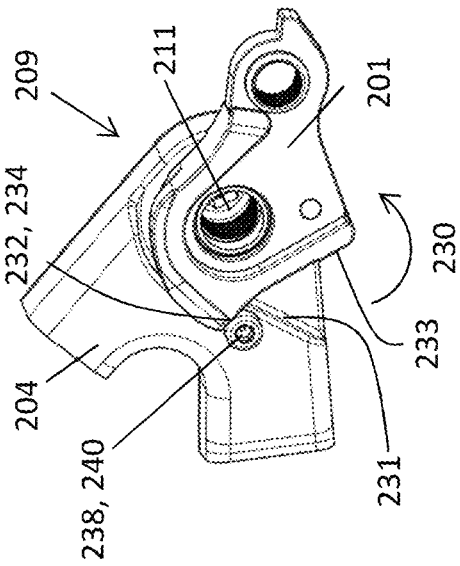
FIG. 9b shows the bracket portion of FIG. 8a with a bracket element mounted thereon, where the bracket element is in a second stop position as viewed from an inner side of the bracket portion.
Figure 8A:
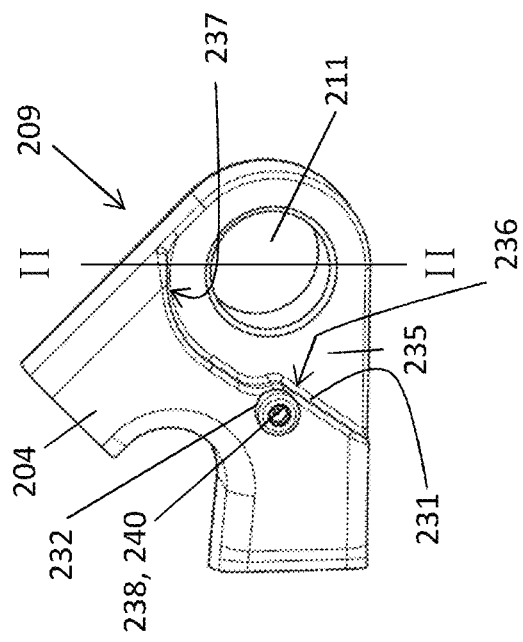
FIG. 8a shows a rear end of a frame with a holding portion designed according to the first exemplary embodiment with a depression designed according to a second alternative and a projection designed according to a second alternative, as viewed from an inner side of the bracket portion.
Figure 9A:
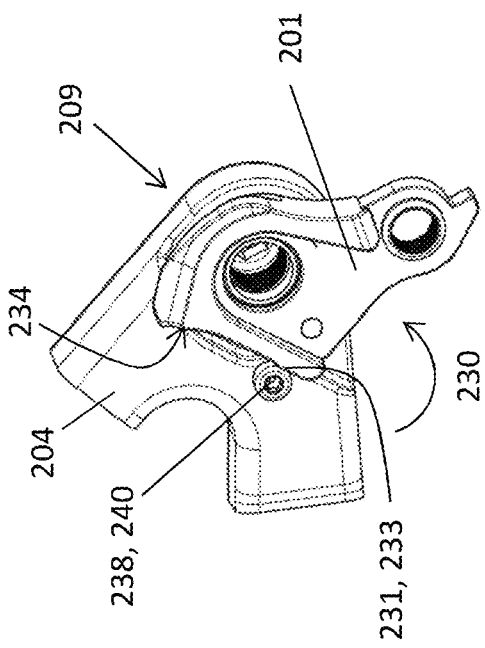
FIG. 9a shows the bracket portion illustrated in FIG. 8a with a bracket element mounted thereon, where the bracket element is illustrated in a first stop position as viewed from an inner side of the bracket portion.

FIG. 8 shows a second possible configuration of the depression 235 in which the first rectilinear subsection 236 of its edge merges with an offset into the second curved subsection 237 of its edge. As shown in FIG. 9a, the first stop formation 233 of the bracket element 201 can lie against the rectilinear first subsection 236 of the edge of the depression 235 when the rear bracket element 201 is in the first stop position or desired position.

The projection 239 (see FIG. 6) is connected integrally/fixedly to the bracket portion 209. The projection 239 can alternatively be designed as a projection 240 which is connected releasably to the rear bracket portion 209, as shown in FIG. 8. For example, the rear bracket portion 209 can have a cutout, such as cutout 6 shown in FIG. 1, into which the releasable projection 240 can be screwed or secured by a press fit. For example, during the mounting of the bracket element 201 on the rear bracket portion 209, a projection 240 adapted to the bracket element 201 can be connected to the rear bracket portion 209. As previously described with regard to FIGS. 6 and 7, the releasable projection 240 can then form the mating stop formation of the rearward rotational stop 232. The mating stop formation, as shown in FIG. 9b, is in the second stop position, stopped against the second stop formation 234 of the bracket element 201.

The projection 238 can be arranged adjacent to the offset (see FIG. 8a) between the first subsection 236 and the second subsection 237 of the edge of the depression 235. The projection 238 is irrespective of the formation thereof as a projection 239, 240 connected integrally or releasably to the bracket portion 209.

FIG. 10 shows a third possible configuration of the depression 235, the edge of which can comprise three rectilinear subsections 236, 236', 236", wherein an offset can be arranged between the first rectilinear subsection 236 and the second rectilinear subsection 236' and/or between the second rectilinear subsection 236' and the third rectilinear subsection 236". The third possible configuration, also the second and/or first possible configuration, of the depression 235 provides a distance between the edge of the depression and a boundary of the bracket opening 211.

Furthermore, FIG. 10 shows a third possible configuration of the projection 238 as an elongate projection 241. For example, an edge region of the elongate projection 241 can extend adjacent to the first subsection 236, or bordering the first subsection 236. As seen in FIG. 10b, the first subsection 236 of the edge of the depression 135 can form in a lower partial region of the elongate projection 241. An upper partial region can protrude from a surface of the bracket portion 209.

FIG. 11a shows the elongate projection 241 in the first stop position or desired position in which the first stop formation 233 of the bracket element 201 is located against the first subsection 236 of the edge of the depression 235 (i.e. the lower partial region of the elongate projection 241). At the same time, the first stop formation 233 can also strike against the upper partial region of the elongate projection 241.

Furthermore, the elongate projection 241 can have a rounded region on which the mating stop formation of the reverse rotational stop 232 is formed and against which the second stop formation 234 of the bracket element 201 can strike in the second stop position, as shown in FIG. 11b.

Figure 12C:
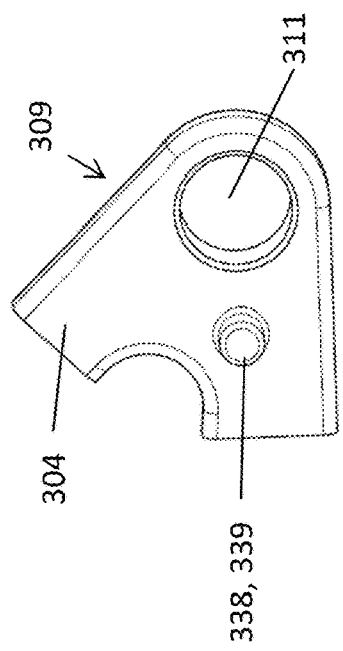
FIG. 12c shows the rear end of a frame with a bracket portion designed according to a second exemplary embodiment with a projection designed according to a first alternative in a perspective view.
Figure 12B:
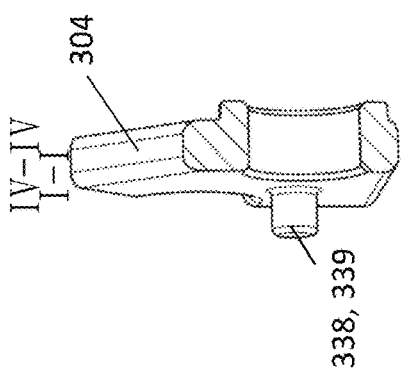
FIG. 12b is a sectional view formed along lines IV-IV of FIG. 12a of the rear end of the frame.
Figure 12A:
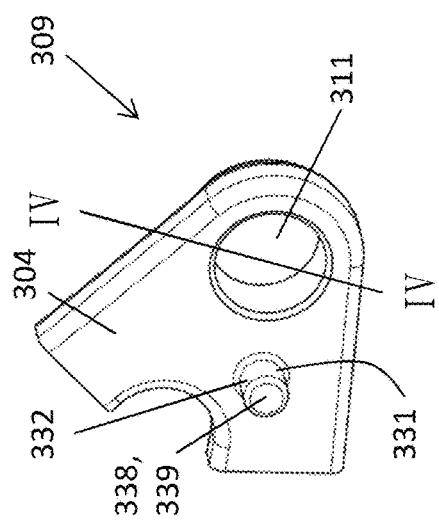
FIG. 12a shows a rear end of a frame with a bracket portion designed according to a second exemplary embodiment with a projection designed according to a first alternative in a perspective view.
Figure 13C:
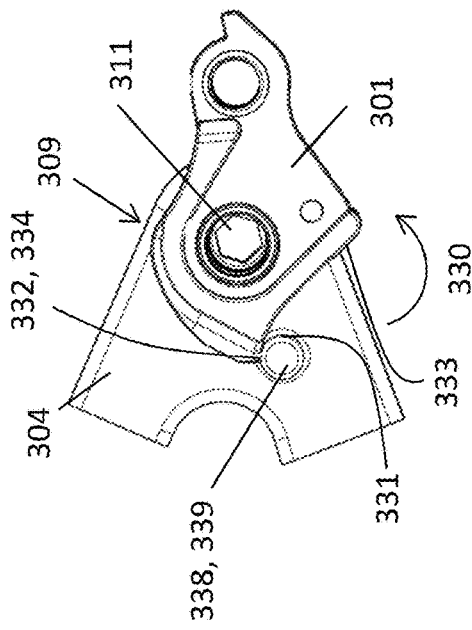
FIG. 13c shows the bracket portion illustrated in FIG. 12a with a bracket element mounted thereon, where the bracket element is illustrated in a second stop position as viewed from at an inner side of the bracket portion.
Figure 13B:
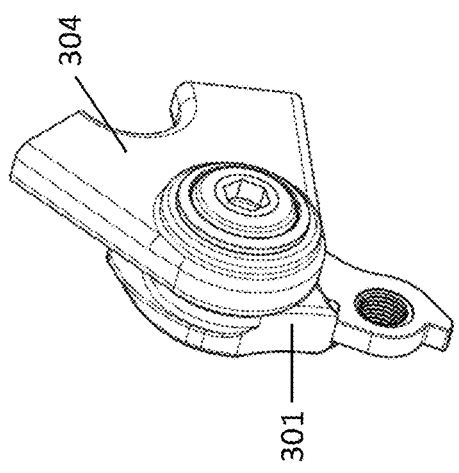
FIG. 13b shows a perspective view the bracket portion illustrated in FIG. 12a with a bracket element mounted thereon, where the bracket element is illustrated in a first stop position as viewed from at an inner side of the bracket portion.

FIGS. 12 and 13 illustrate the bracket portion 309 according to a second exemplary embodiment in which the mating stop formation of the forward rotational stop 331 and the mating stop formation of the rearward rotational stop 332 are formed on a projection 338 connected to the rear bracket portion 209. As explained with regard to the first exemplary embodiment, the projection can be a projection 239 integrally/fixedly connected to the bracket portion 309 or a projection 240 which is releasably connected to the rear bracket portion 309 and has a round and/or elongate shape or another suitable shape. In this second exemplary embodiment of the rear bracket portion 309, the rear bracket portion 309 does not have a depression and consequently also does not have an edge of the depression.

Figure 13A:
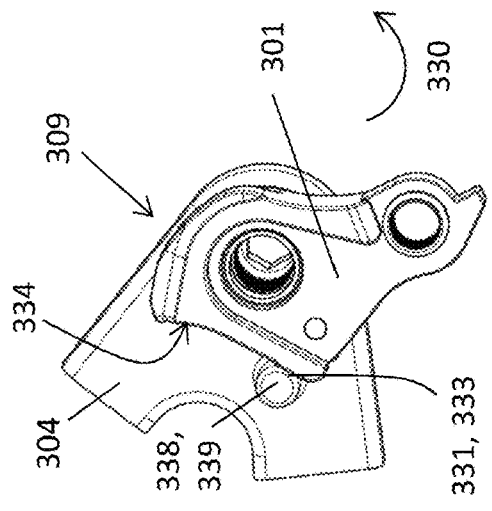
FIG. 13a shows the bracket portion illustrated in FIG. 12a with a bracket element mounted thereon, where the bracket element is illustrated in a first stop position as viewed from an inner side of the bracket portion.

The bracket element 301 is illustrated in the first stop position or desired position in FIGS. 13a,b and in the second stop position in FIG. 13c. It is apparent in the figures that the projection 338 can form the mating stop formation of the forward rotational stop 231, against which the mating stop formation of the first stop formation 333 of the bracket element 301 can strike in the first stop position or desired position. Also, in the second stop position, the mating stop formation the second stop formation 334 of the bracket element 301 can strike against the mating stop formation of the rearwards rotational stop 332.

Figure 14B:
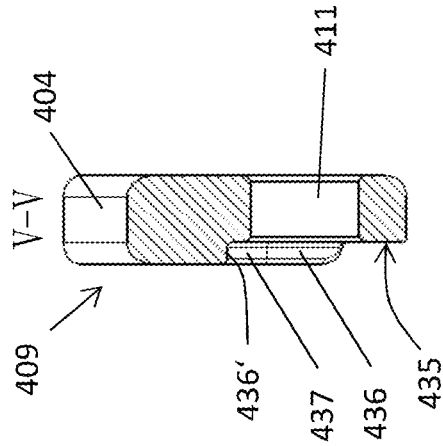
FIG. 14b is a sectional view formed along line V-V of FIG. 14a of the rear end of the frame.
Figure 15B:
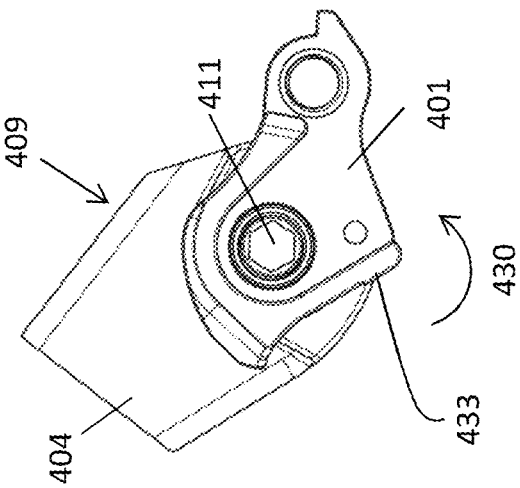
FIG. 15b shows the bracket portion illustrated in FIG. 14a with a bracket element mounted thereon, where the bracket element is illustrated in a second stop position with the bracket portion as viewed from the inner side of the bracket portion.
Figure 14A:
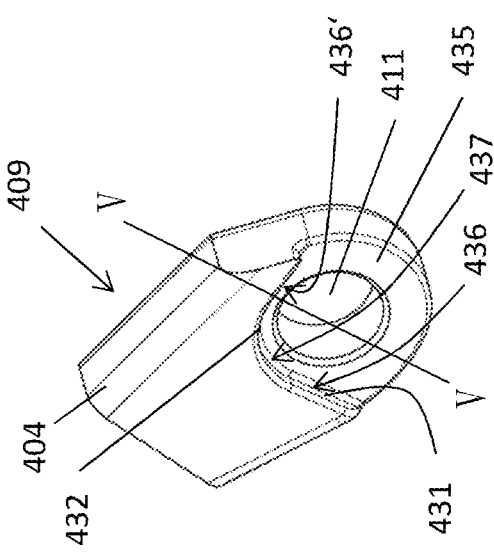
FIG. 14a shows a perspective view of a rear end of a frame with a bracket portion designed according to a third exemplary embodiment with a depression, in a perspective view.
Figure 15A:
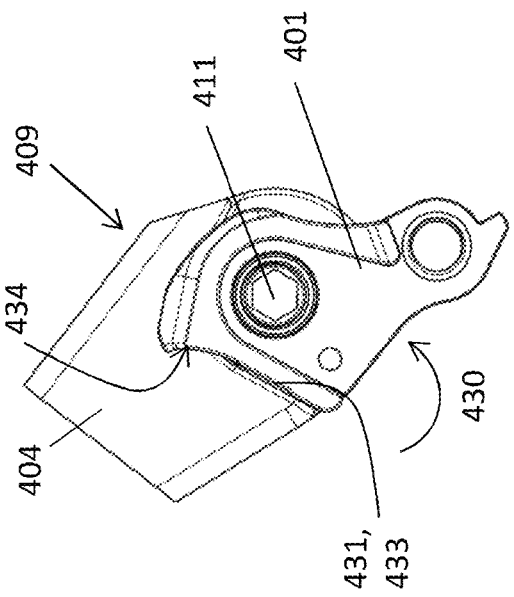
FIG. 15a shows the bracket portion illustrated in FIG. 14a with a bracket element mounted thereon, where the bracket element is illustrated in a first stop position as viewed from the inner side of the bracket portion.

FIGS. 14 and 15 illustrate the bracket portion 409 according to a third exemplary embodiment in which a mating stop formation of the forward rotational stop 431 and a mating stop formation of the rearward rotational stop 432 are formed on the edge of the depression 435 of the rear bracket portion 409.

The edge of the depression can have a first rectilinear subsection 436, a second curved subsection 437, and a third rectilinear subsection 436', which merge into one another. In the first stop position or desired position (see FIG. 15a) the first stop formation 433 of the bracket element 401 can be at a stop against the mating stop formation of the forward rotational stop 231. The mating stop formation is formed by the first subsection 436 of the edge of the depression. In the second stop position (see FIG. 15b) the second stop formation 434 of the bracket element 401 can be at a stop against the mating stop formation of the rearwards rotational stop 432. The mating stop formation is formed by the third subsection 436' of the edge of the depression.

The design of the depression 235, 435 at the rear end of the rear bracket portion 209, 409, which depression merges on one side into the closing edge of the bracket portion 209, 409 and is bounded on the other side by an edge of the depression 235, 435, can be formed in a corresponding manner for the depressions according to the first and/or the third exemplary embodiments. The edge of the depression 235, 435 can connect the depression to the inwardly pointing surface of the bracket portion 209, 409. There can in each case be a distance between the edge of the depression 235, 435 and the boundary of the bracket opening 211, 411. The distance can be at least 1 mm. In an alternate, embodiment the distance can be 3 mm. In a further embodiment, the distance can be 5 mm.

FIG. 16 illustrates an exemplary embodiment of a bracket element 1001. The bracket element 1001 can be one of the previously mentioned bracket elements 1, 101, 201, 301, 401. Components or parts which are present both in the bracket element 1 and in the bracket element 1001 and/or interact with the bracket elements are denoted below by reference signs incremented by 1000 and the function thereof is not repeated once again. It goes without saying that the bracket element 1001 can also be used instead of the bracket elements 101, 201, 301 and 401 used in the previously described exemplary embodiments. Furthermore, it can be a bracket element 1001 in which the region 1002 made from plastic is releasably connected to the region made from metal.

The bracket element 1001 illustrated in FIG. 16 can have a contact flange 1043 which corresponding to the illustration, can be designed as a circular ring. The contact flange 1043, in particular a contact surface 1044 thereof, can be configured to lie against a mating contact surface of the bracket portion, which surface points inward in the direction of the bracket element 1001, and/or to make contact with the mating contact surface. In the mounted state, the contact surface 1044 can point in the direction of the bracket portion.

As is best apparent in FIGS. 16a and b, the contact flange 1043 can adjoin the spacer 1014. The contact flange 1043 is formed integrally with the bracket element 1001, in particular integrally with its plastic region 1002. However, the contact flange 1043 can also be adhesively bonded, screwed, pressed or latched to the bracket element 1001

The contact surface 1044 and the mating contact surface have mutually corresponding configurations. The contact surface 1044 and the mating contact surface are formed particularly true to size. The bracket element 1001 can thereby be oriented in relation to the bracket portion. It goes without saying that, for the desired orientation, the contact flange 1043 can have various other shapes. For example, individual projections or other shapes would also be conceivable.

In a first embodiment, a bracket element is configured to connect a bicycle frame to a rear gearshift mechanism of a derailleur system, including a first portion which has an opening or cutout for receiving a portion of a bicycle rear wheel axle, and a second portion which has a mounting opening to which a basic element of the rear gearshift mechanism can be secured characterized in that the bracket element is formed with at least one region made from plastic and a region made from metal, and the region made from plastic is fixedly connected to the region made from metal.

In the first embodiment, the region made from metal is lug-shaped and extends into the first and the second portion or at least partially forms said portions and at least partially forms the opening or cutout and at least partially forms the mounting opening.

In the first embodiment, the region made from plastic is injection moulded around the region made from metal.

In the first embodiment, the region made from metal is realized with at least one through hole or at least one recess, which through hole or which recess is filled with plastic which belongs to the region made from plastic.

In the first embodiment, the bracket element, preferably its region made from plastic, has at least one stop formation which is suitable for lying or stopping against at least one mating stop formation of the bicycle frame.

In the first embodiment, the bracket element can be mounted on an inner side of an associated rear bracket portion of the bicycle frame and, in particular in the region made from plastic, has an axially protruding collar pointing away from said bracket portion, wherein a guide opening or guide cutout formed by the axially protruding collar preferably has a U-shaped or J-shaped form in top view.

In the first embodiment, the bracket element, preferably its region made from plastic, forms a diverting surface region on which a chain can slip transversely with respect to its longitudinal direction.

In the first embodiment, the bracket element can be mounted on a/the inner side of a/the associated rear bracket portion of the bicycle frame and, by means of the region made from plastic, lies against said bracket portion or/and can be brought into form-fitting connection with a bracket opening in said bracket portion.

In the first embodiment, the bracket element can be mounted on a/the inner side of the associated rear bracket portion of the bicycle frame by means of a receptacle, which is formed in the region made from plastic, for a fastening screw and by means of a plug-in axle, wherein the receptacle can preferably be brought into form-fitting connection with a/the bracket opening in the bracket portion.

In the first embodiment, the receptacle for the fastening screw has an inner thread which can be brought into engagement with an outer thread, in particular a left-hand thread, of the fastening screw.

In the first embodiment, the bracket element, preferably its region made from plastic, has a spacer or/and a contact flange which can be placed or is placed in a manner lying against a/the inner side of a/the associated rear bracket portion in order to position the region made from metal in a defined manner relative to the associated rear bracket portion of the bicycle frame.

In a second embodiment, a bicycle includes a bicycle frame with a rear wheel which can be driven by means of a derailleur system and has a sprocket set of the derailleur system, wherein a chain of the derailleur system that engages with a selected sprocket in the respective selected gear can be transferred by means of a rear gearshift mechanism of the derailleur system between the sprockets of the sprocket set, wherein the rear gearshift mechanism is connected to the bicycle frame by means of a bracket element mounted on an inner side of an associated rear bracket portion of the bicycle frame, including, a first portion which has an opening or cutout in which a portion of a bicycle rear wheel axle of the rear wheel is accommodated, and a second portion which has a mounting opening to which a basic element of the rear gearshift mechanism is secured, characterized in that the bracket element is secured or can be secured in a frictionally locking manner in a desired position on the associated rear bracket portion and, in the event of application of a rotational force exceeding the frictionally locking holding force, can be rotated out of the desired position in the direction of a stop position in which the bracket element is at a stop against at least one rotational stop of the rear bracket portion.

In the second embodiment, the bracket element is designed according to one of the first embodiment or the second embodiment.

In the second embodiment, the bracket element is formed with at least one region made from plastic and a region made from metal, and the region made from plastic is releasably connected to the region made from metal.

In the second embodiment, the rear bracket portion has two rotational stops, a forwards rotational stop and a rearwards rotational stop, wherein the bracket element is at a stop against the forwards rotational stop in a first stop position corresponding to the desired position, and, in the event of the application of the rotational force exceeding the frictionally locking holding force, can be rotated into a second stop position at a stop against the rearwards rotational stop.

In the second embodiment, the bracket element is designed according to one of the first embodiment or the second embodiment and the first stop formation of the bracket element, which stop formation strikes against a mating stop formation of the forwards rotational stop in the first stop position, is formed by the region made from plastic.

In the second embodiment, the bracket element is designed according to one of the first embodiment or the second embodiment and a second stop formation of the bracket element, which stop formation strikes against a mating stop formation of the rearwards rotational stop in the second stop position, is formed by the region made from plastic.

In the second embodiment, a depression in the associated bracket portion or a projection protruding from the latter forms the mating stop formation of the forwards rotational stop.

In the second embodiment, a depression in the associated bracket portion or the or a projection protruding from the latter forms the mating stop formation of the rearwards rotational stop.

In the second embodiment, the bracket element forms a diverting surface region on which a chain can slip transversely with respect to its longitudinal extent in a direction pointing away from the inner side of the associated rear bracket portion.

A third embodiment comprising a bicycle frame with a rear wheel which can be driven by means of a derailleur system and which has a sprocket set of the derailleur system, wherein a chain of the derailleur system that engages with a selected sprocket in a respective selected gear can be transferred between the sprockets of the sprocket set by means of a rear gearshift mechanism of the derailleur system, wherein the rear gearshift mechanism is connected to the bicycle frame by means of a bracket element mounted on an inner side of an associated rear bracket portion of the bicycle frame, including: a first portion which has an opening or cutout in which a portion of a bicycle rear wheel axle of the rear wheel is accommodated, and a second portion which has a mounting opening to which a basic element of the rear gearshift mechanism is secured, characterized in that the bracket element is realized, on at least one outer edge region, with a diverting surface region on which the chain can rest when said chain has sprung from a sprocket of the sprocket set beyond the axial region of the sprocket set in the direction of the bracket element and can then slide in the direction of the smallest sprocket in order to restore the engagement of the chain with the or a sprocket of the sprocket set or to contribute thereto.

In the third embodiment, the bracket element is designed according to one of the preceding embodiments.

In the third embodiment, the bracket element is formed with at least one region made from plastic and a region made from metal, and the region made from plastic is releasably connected to the region made from metal.

In the third embodiment, a distance between an outer surface of the bracket elements, which outer surface points in the direction of the sprocket set, and the smallest sprocket is such that the chain cannot be jammed inbetween.

In the third embodiment, with respect to a centre point of a/the opening or cutout of the bracket element, a radial level of a first edge, which is closest to the sprocket set, of the diverting surface region lies at the radial level of a tip diameter of the smallest sprocket of the sprocket set or is offset radially inwards in relation thereto.

In the third embodiment, the diverting surface region has a second edge which is closer to the associated rear bracket portion than the first edge and is offset outwards with respect to the radial level of the first edge.

In the third embodiment, an imaginary extension which intersects the two edges of the diverting surface region and runs in the direction of the smallest sprocket likewise intersects the peripheral surface of the smallest sprocket, which peripheral surface is defined by the tip diameter of the smallest sprocket of the sprocket set, or intersects the smallest sprocket within the tip circle.

In the third embodiment, the diverting surface region is a diverting surface region adjacent to a load side of the chain or a diverting surface region adjacent to a return side, or extends in such a manner that it is adjacent both to the load side and to the return side of the chain, or the bracket element comprises two separately formed diverting surface regions of which one is adjacent to the load side of the chain and the other to the return side of the chain, wherein preferably the two diverting surface regions are arranged at different rotational angles with respect to a/the centre point of a/the opening or cutout of the bracket element.

In the third embodiment, the two diverting surface regions are arranged at different radial levels with respect to the centre point of the opening or cutout.

In the third embodiment, whenever a contact line or a contact point of an outer edge of an outer link plate of a chain link of the chain, with the diverting surface region adjacent to the return side, is located at a radial level which corresponds to a radial level of a tip diameter of the smallest sprocket or of a tooth tip edge of a tooth tip of a sprocket tooth of the smallest sprocket, said tooth tip edge being further away from the bracket element, an inner edge of an inner link plate of a chain link adjacent to the chain link, said inner link plate being further away from the bracket element, lies at the same axial level as a tooth tip edge determining the tip diameter or the tooth tip edge further away from the bracket element, or is at a greater axial distance from the bracket element than said tooth tip edge.

In the third embodiment, the bicycle furthermore has a contact flange which may be connected or is connected to the bracket element or is formed by the latter, or may be connected or is connected to the bracket portion or is formed by the latter.

In the third embodiment, a contact surface of the bracket element, said contact surface pointing towards the bracket portion, lies against a mating contact surface of the bracket portion, wherein a configuration formed from the contact surface and the mating contact surface is formed on the contact flange.

In the third embodiment, the contact flange protrudes with the contact surface from the bracket element and the mating contact surface is formed by the bracket portion and is recessed in relation to an adjacent surface of the bracket portion, wherein preferably the contact flange engages in a depression forming the mating contact surface.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bracket element for connecting a bicycle frame to a rear gearshift mechanism of a derailleur system, comprising:
   a first portion, the first portion including an opening for receiving at least a portion of a bicycle rear wheel axle; and
   a second portion, the second portion including a mounting opening to which at least a portion of the rear gearshift mechanism is secured,
   wherein the bracket element is formed with a plastic region and a metal region, the plastic region configured to be injection moulded around the metal region and fitting within a through hole or recess of the metal region, and
   wherein the plastic region forms a diverting surface region on which a chain can slip transversely with respect to its longitudinal direction.

2. The bracket element of claim 1, wherein the metal region is lug-shaped, and extends into the first and the second portion or at least partially forms the first portion and the second portion.

3. The bracket element of claim 2, wherein the metal region at least partially forms the opening and at least partially forms the mounting opening.

4. The bracket element of claim 1, wherein the metal region includes at least one through hole which is filled with plastic from the plastic region.

5. The bracket element of claim 1, wherein the plastic region includes at least one stop formation, the stop formation stops against a mating stop of the bicycle frame.

6. The bracket element of claim 1, wherein the bracket element includes a receptacle formed in the plastic region, the receptacle receives a fastening screw to secure the bracket element to a rear bracket portion of the bicycle frame.

7. The bracket element of claim 6, wherein the receptacle has an inner thread which can be brought into engagement with an outer thread of the fastening screw.

8. The bracket element of claim 7, wherein the outer thread is a left-hand thread.

9. The bracket element of claim 1, wherein the plastic region includes a spacer that orients the metal region in a defined manner relative to a rear bracket portion of the bicycle frame.

* * * * *